US009442803B2

(12) United States Patent
Rueger et al.

(10) Patent No.: US 9,442,803 B2
(45) Date of Patent: Sep. 13, 2016

(54) METHOD AND SYSTEM OF DISTRIBUTED BACKUP FOR COMPUTER DEVICES IN A NETWORK

(71) Applicant: International Business Machines Corporation, Armonk, NY (US)

(72) Inventors: Erik Rueger, Ockenheim (DE); Tim U. Scheideler, Schoenenberg (CH)

(73) Assignee: International Business Machines Corporation, Armonk, NY (US)

( * ) Notice: Subject to any disclaimer, the term of this patent is extended or adjusted under 35 U.S.C. 154(b) by 144 days.

(21) Appl. No.: 14/313,040

(22) Filed: Jun. 24, 2014

(65) Prior Publication Data

US 2015/0370643 A1    Dec. 24, 2015

(51) Int. Cl.
*G06F 11/00* (2006.01)
*G06F 11/14* (2006.01)
*H04L 29/08* (2006.01)
*G06F 17/30* (2006.01)

(52) U.S. Cl.
CPC ..... *G06F 11/1446* (2013.01); *G06F 17/30194* (2013.01); *H04L 67/1097* (2013.01); *G06F 2201/84* (2013.01)

(58) Field of Classification Search
CPC combination set(s) only.
See application file for complete search history.

(56) References Cited

U.S. PATENT DOCUMENTS

| | | | |
|---|---|---|---|
| 7,020,678 B1 * | 3/2006 | Hubbard | G07F 17/3237 709/201 |
| 7,082,474 B1 * | 7/2006 | Hubbard | H04L 67/10 709/202 |
| 7,330,997 B1 * | 2/2008 | Odom | G06F 11/1464 711/162 |
| 7,370,336 B2 | 5/2008 | Husain et al. | |
| 7,418,478 B1 * | 8/2008 | Orling | H04L 67/16 709/203 |
| 7,437,388 B1 * | 10/2008 | DeVos | G06F 11/1464 |
| 7,685,227 B2 * | 3/2010 | Gerber | H04L 12/24 370/428 |
| 7,685,459 B1 * | 3/2010 | De Spiegeleer | G06F 11/1453 714/6.12 |
| 7,698,428 B2 | 4/2010 | Fatula, Jr. | |
| 7,831,562 B1 * | 11/2010 | DeVos | G06F 11/1458 707/640 |
| 8,712,966 B1 * | 4/2014 | Armorer | G06F 11/1464 707/645 |
| 8,805,786 B1 * | 8/2014 | Natanzon | G06F 17/00 707/639 |
| 8,903,777 B1 * | 12/2014 | Searls | G06F 17/3007 707/665 |
| 8,930,320 B2 * | 1/2015 | Tung | G06F 11/1451 707/652 |
| 8,930,497 B1 * | 1/2015 | Holmes | G06F 15/16 709/217 |
| 8,954,793 B2 * | 2/2015 | Lahdensivu | G06F 11/1008 707/687 |
| 9,244,777 B2 * | 1/2016 | Boullery | G06F 11/1461 |

(Continued)

FOREIGN PATENT DOCUMENTS

WO    2009031157 A2    3/2009

OTHER PUBLICATIONS

Subramanian et al., "Peer-To-Peer Computing: The Evolution of a Disruptive Technology", Idea Group Publishing, pp. 1-308, Copyright © 2005 by Idea Group Inc.

*Primary Examiner* — Amine Riad
(74) *Attorney, Agent, or Firm* — Edward P. Li

(57) ABSTRACT

A method and a distributed backup system for data backup are provided. The distributed backup system comprises a plurality of computer devices connected by a network. In the system, one of the computer devices comprises a program for managing data backup in the distributed data backup system. In the system, one of the computer devices comprises a first storage space for storing its own files and a second storage space for storing backup files of other computer devices. In the system, the one of the computer devices comprises a first database for storing metadata files of its own files and a second database for storing metadata files of the backup files of the other computer devices.

17 Claims, 20 Drawing Sheets

(56) References Cited

U.S. PATENT DOCUMENTS

| | | | | |
|---|---|---|---|---|
| 2002/0010910 A1* | 1/2002 | Crudele | G06F 8/61 | 717/128 |
| 2002/0129264 A1* | 9/2002 | Rowland | H04L 63/102 | 726/26 |
| 2003/0033543 A1* | 2/2003 | Hubbard | G06Q 30/02 | 726/4 |
| 2004/0200973 A1* | 10/2004 | Ogawa | G01T 1/161 | 250/370.11 |
| 2008/0147821 A1* | 6/2008 | Dietrich | G06F 17/30206 | 709/216 |
| 2008/0195675 A1* | 8/2008 | Torrent | G06F 11/1464 | |
| 2010/0030983 A1* | 2/2010 | Gupta | G06F 11/1466 | 711/162 |
| 2010/0218037 A1* | 8/2010 | Swartz | G06F 17/30 | 714/6.12 |
| 2010/0257403 A1* | 10/2010 | Virk | G06F 11/1453 | 714/15 |
| 2010/0274765 A1* | 10/2010 | Murphy | G06F 11/1451 | 707/652 |
| 2011/0145199 A1* | 6/2011 | Prasad Palagummi | G06F 11/1435 | 707/654 |
| 2011/0173247 A1* | 7/2011 | Hubbard | G06Q 30/02 | 709/203 |
| 2014/0081919 A1* | 3/2014 | Matsumoto | G06F 11/3495 | 707/652 |
| 2014/0289202 A1* | 9/2014 | Chan | G06F 9/54 | 707/652 |

* cited by examiner

METHOD AND SYSTEM OF DISTRIBUTED BACKUP FOR COMPUTER DEVICES IN A NETWORK

TECHNICAL FIELD OF THE INVENTION

The present invention relates generally to data backup, and more particularly to distributed backup without need of a central backup server and central storage.

BACKGROUND

The overarching business requirement is to secure data stored on computer devices, such as personal computers (PCs) and mobile devices, against data loss due to hardware failure and accidental deletion. Regular backup over a wide area network (WAN) to a data center requires investment in bandwidth and a central backup system. Today's commercial backup solutions include three components: (1) a centrally managed, policy driven backup agent installed on every device; (2) a central backup server receiving data from the agents, maintaining a catalogue of data and providing the restore service; and (3) central storage, e.g., a tape library. The two last components are the infrastructure cost drivers. Typical centrally managed PC and/or mobile device backup solutions require an investment in the order of magnitude of $100,000. Due to the high cost, IT organizations often decide not to offer a PC and mobile device backup and restore service at all due to budget constrains. The PCs and the mobile devices can potentially lose their data without data backup.

SUMMARY

In one aspect, a method for data backup in a distributed backup system is provided. The distributed backup system comprises a plurality of computer devices connected by a network. In the method, the computer devices identify and authenticate each other. In the method, one of the computer device stores a file of its own on a first storage space of the one of the computer devices, while other ones of the computer devices store their own files on respective first storage spaces of the other ones of the computer devices. In the method, the one of the computer devices sends a backup file of the file of the one of the computer devices to one or more of the other ones of the computer devices, and the one or more of the other ones of the computer devices stores, on respective second storage spaces of the one or more of the other ones of the computer devices, the backup file of the file of the one of the computer devices. In the method, the other ones of the computer devices send, to the one of computer device, backup files of the their own file, and the one of the computer devices stores, on a second storage space of the one of the computer devices, the backup files of the other ones of the computer devices.

In another aspect, a distributed data backup system is provided. The distributed backup system comprises a plurality of computer devices connected by a network. In the system, one of the computer devices comprises a program for managing data backup in the distributed data backup system. In the system, the one of the computer devices comprises a first storage space for storing its own files and a second storage space for storing backup files of respective files of other ones of the computer devices. In the system, the one of the computer devices comprises a first database for storing metadata files of its own files and a second database for storing metadata files of the backup files of the respective files of the other ones of the computer devices.

DETAILED DESCRIPTION

A solution disclosed in embodiments of the present invention provides backup service for personal computers (PCs) and mobile devices, devoid of a central backup server and central storage. The principal idea in the present invention is to provide a backup service by deploying a backup agent on each PC or mobile device, without the need of central backup server and central storage. The backup service can be applied to any computer device, such as a desktop, a laptop, a handheld PC, or a smartphone, which has a network connection.

The underlying idea is to create a self-organizing network of backup agents providing the backup service. To deliver the service, the backup agents provide two key functions which are the core of the invention. The two key functions are mutual identification and keeping track of backups. In a server-based backup system, both key functions are simple to implement. In the server-based backup system, during the rollout, the backup agents are configured to contact the server, and the server holds a list of authorized backup agents; for keeping track of backups, the server maintains a central database of all backups. However, in a distributed backup environment, backup agents have to find each other and they cannot just use a login and password to authenticate themselves due to the absence of a password authority; they broadcast their presence and have to identify themselves mutually. In the distributed backup environment, for keeping track of backups, it should be considered that the backup agents constantly join and leave the self-organized network. Therefore, the present invention allows the distributed backup environment to cope constantly with the worst case scenario. In the present invention, the dual database concept with inbuilt redundancy allows restore of a file and restore of a file system in a constantly changing self-organizing network.

In the present invention, as a backup pool storage of partner devices in a network, the computer device (such as a PC or a mobile device) in the network has two storage tiers: primary storage tier and backup storage tier; the former is used for the device itself and the latter is used as a backup pool for data originating from the partner devices. Each device in the network is a part of a backup service; the each device does not only receive a backup service from the partner devices, but also provides the backup service to the partner devices. For example, a typical PC hard disk provides more capacity than used by the end user for business purposes. Part of the hard disk can be used to store backup data of colleagues working in the same LAN (Local Area Network). On a 300 GB hard disk, 60 GB are used for business data, 240 GB can be used as a backup pool. With 1% of investment for a classic server-based backup system, a distributed backup system can deliver the backup capacity of the server-based system.

Figure 1:
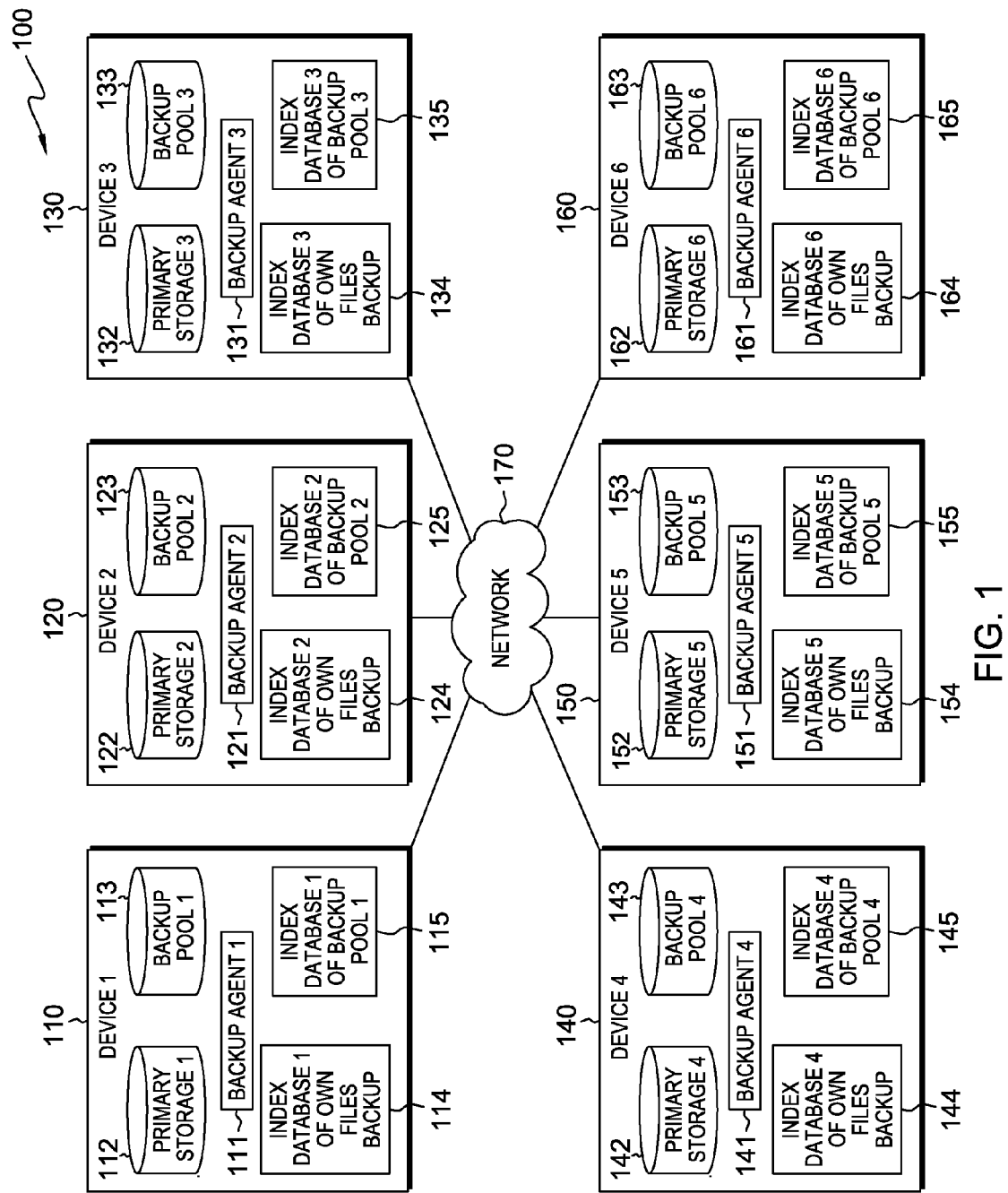
FIG. 1 is a diagram illustrating a distributed backup system and components on computer devices in the distributed backup system, in accordance with one embodiment of the present invention.

FIG. 1 is a diagram illustrating distributed backup system 100 and components on a computer device in the distributed backup system, in accordance with one embodiment of the present invention.

Referring to FIG. 1, distributed backup system 100 comprises a plurality of computer devices. In the embodiment, the computer devices shown in FIG. 1 are devices 1 though 6 (denoted by numerals 110, 120, 130, 140, 150, and 160, respectively) which are connected by network 170. In the embodiment, one of the computer devices can be any computer device, such as a desktop, a laptop, a handheld PC, or smartphone. Network 170 is an organization's network; it may be a LAN (Local Area Network) of an office building, a company's WAN (Wide Area Network), a VPN (Virtual Private Network), or a set of smartphones connected to internet.

Referring to FIG. 1, each of devices 1 though 6 (110, 120, 130, 140, 150, and 160) comprises a primary storage and a backup pool. In the embodiment, primary storage 1 through primary storage 6 (denoted by numerals 112, 122, 132, 142, 152, and 162, respectively) are on devices 1 though 6 (110, 120, 130, 140, 150, and 160), respectively; backup pools 1 through 6 (denoted by numerals 113, 123, 133, 143, 153, and 163, respectively) are on devices 1 though 6 (110, 120, 130, 140, 150, and 160), respectively. Primary storage 1 though primary storage 6 (112, 122, 132, 142, 152, and 162) are used for data of end-users of devices 1 through 6 (110, 120, 130, 140, 150, and 160). Each backup pool on one device provides backup storage for files receiving from partner devices of the one device; for example, backup pool 1 (113) on device 1 (110) provides backup storage for files receiving from devices 2 through 6 (120, 130, 140, 150, and 160).

Referring to FIG. 1, each of devices 1 though 6 (110, 120, 130, 140, 150, and 160) comprises a backup agent. In the embodiment, backup agents 1 through 6 (denoted by numerals 111, 121, 131, 141, 151, and 161, respectively) are on devices 1 though 6 (110, 120, 130, 140, 150, and 160), respectively. Each of the backup agents performs tasks as follows: to identify partner devices which provide backup pool(s); to maintain a list of own files backed up on the partner devices (e.g., what files have been stored; where the files have been stored, and when the files have been stored); to maintain a list of files received from the partner devices; to trigger a backup process; to provide a user interface; and to purge the backup pools and index databases according to backup data expiration policy. Each of the backup agents identifies itself with a unique identifier (UID). Each of the backup agents may use its MAC (media access control) address as the UID.

Referring to FIG. 1, each of devices 1 though 6 (110, 120, 130, 140, 150, and 160) comprises two index databases: index database of own files backup and index database of a backup pool. In the embodiment, index databases 1 through 6 (denoted by numerals 114, 124, 134, 144, 154, and 164, respectively) of own files backup are on devices 1 though 6 (110, 120, 130, 140, 150, and 160), respectively. Index databases 1 through 6 (114, 124, 134, 144, 154, and 164) of own files backup are exclusively managed by backup agents 1 through 6 (111, 121, 131, 141, 151, and 161), respectively. Metadata is written on the index databases 1 through 6 of own files backup during identification of the partner devices, a backup process, and a restore process.

Referring to FIG. 1, respectively on devices 1 though 6 (110, 120, 130, 140, 150, and 160), index databases 1 through 6 (denoted by numerals 115, 125, 135, 145, 155, and 165, respectively) of backup pools store metadata for backup pools 1 through 6 (113, 123, 133, 143, 153, and 163), respectively. The index databases 1 through 6 of backup pools are used to store indexes which link to backup of the received files from partner devices, while the backup pools store content of the received files. Each index database of a backup pool is used by backup agents on partner devices; for example, index database 1 (115) of backup pool 1 (113) on device 1 (110) is used by backup agents 2 through 6 (121, 131, 141, 151, and 161) on devices 2 through 6 (120, 130, 140, 150, and 160).

Figure 2:
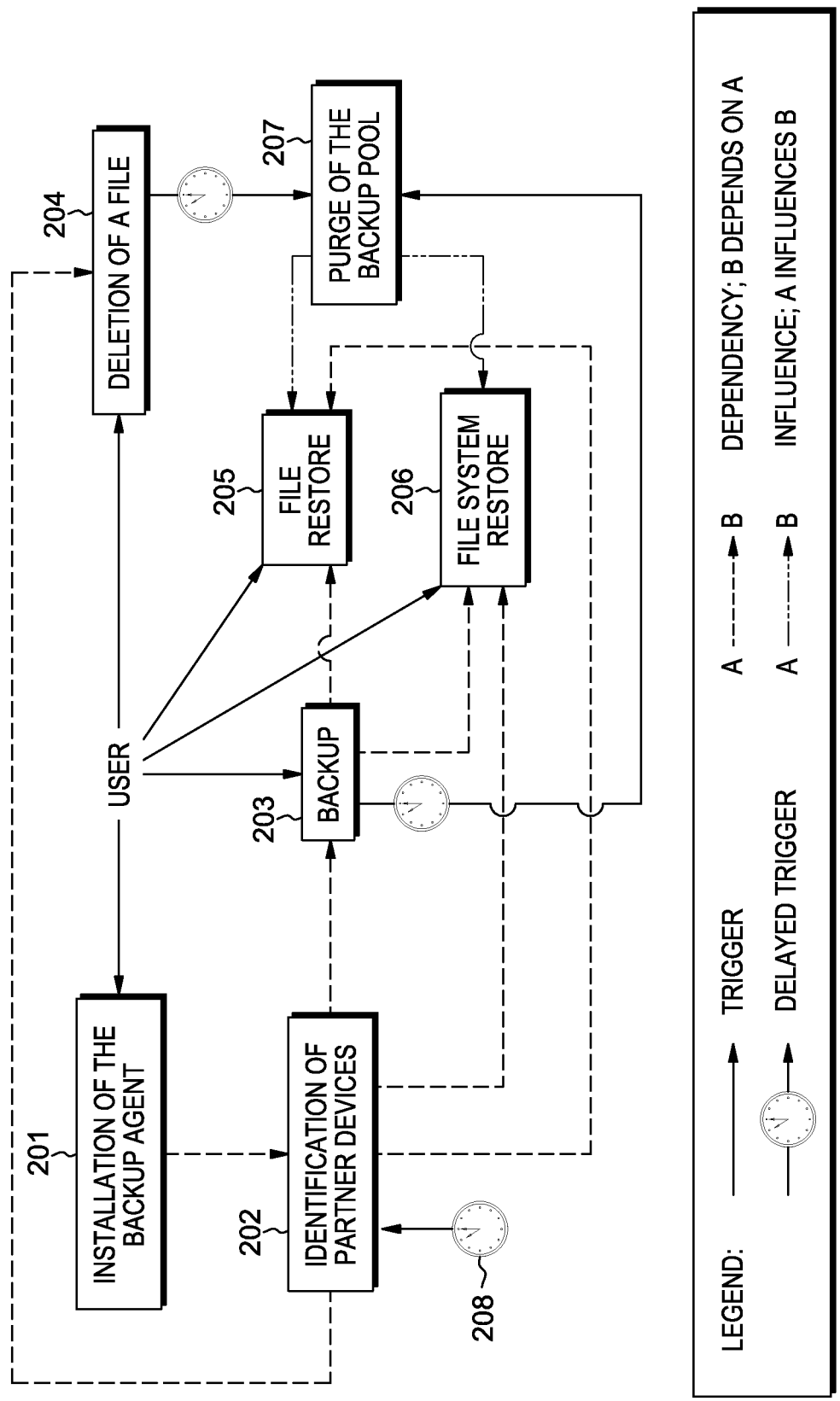
FIG. 2 is a diagram illustrating relationships among processes in a distributed backup system, in accordance with one embodiment of the present invention.

FIG. 2 is a diagram illustrating relationships among processes in a distributed backup system, in accordance with one embodiment of the present invention. The processes include installation (201) of backup agents on devices, identification (202) of partner devices, backup (203), deletion (204) of a file, file restore (205), file system restore (206), and purge (207) of backup pools. The process of identification (202) of partner devices will be discussed in detail in later paragraphs with reference to FIGS. 3(A) and 3(B). The process of backup (203) will be discussed in detail in later paragraphs with reference to FIGS. 4(A) and 4(B). The process of deletion (204) of a file will be discussed in detail in later paragraphs with reference to FIGS. 5(A) and 5(B). The process of file restore (205) will be discussed in detail in later paragraphs with reference to FIGS. 6(A) and 6(B). The process of file system restore (206) will be discussed in detail in later paragraphs with reference to FIGS. 7(A)-7(F). The process of purge (207) of backup pools will be discussed in detail in later paragraphs with reference to FIGS. 8(A)-8(C).

FIG. 2 shows how the processes are triggered and shows dependencies between the processes. Installation (201) of backup agents on devices, backup (203), deletion (204) of a file, file restore (205), and file system restore (206) are initiated by a user. Identification (202) of partner devices is triggered by scheduler 208 on each device shown in FIG. 1. Purge (207) of backup pools is done after a given number of days. Backup (203), deletion (204) of a file, file restore (205), and file system restore (206) require to communicate with the partner devices and therefore they depend on identification (202) of partner devices. File restore (205) and file system restore (206) depend on backup (203). Dashed lines in FIG. 2 show these dependencies. Purge (207) of backup pools adversely affects restore capability and thus affects file restore (205) and file system restore (206). The dash-dotted lines in FIG. 2 show the influences.

Installation (201) of backup agents on devices may be implemented by a software distribution system. When a computer device (such as such as a desktop, a laptop, a handheld PC, or a smartphone) which does not have the backup agent installed is connected to an organization's network, the software distribution system may detect that the backup agent is missing, corrupted, or wrongly configured. Then, the software distribution system will install the backup agent and configures it according to the default policies. Typically, the software distribution system performs the installation in the background without interaction by the user. However, when the user starts to use the backup agent for the first time, the user may need to enter a passphrase which is used for encryption of the backup (assuming that encryption is enabled). In case a device is replaced or reinstalled, the previous passphrase must be used. Also, when the user starts to use the backup agent for the first time, the user may note down the MAC (media access control) address of the device. The MAC address is used as a unique identifier (UID) of the device. In case a file system of the device must be restored, the UID of the device must be used to identify the files in backup pools (it will be discussed in detail in latter paragraphs with reference to FIGS. 7(A)-7(F)).

Figure 3A:
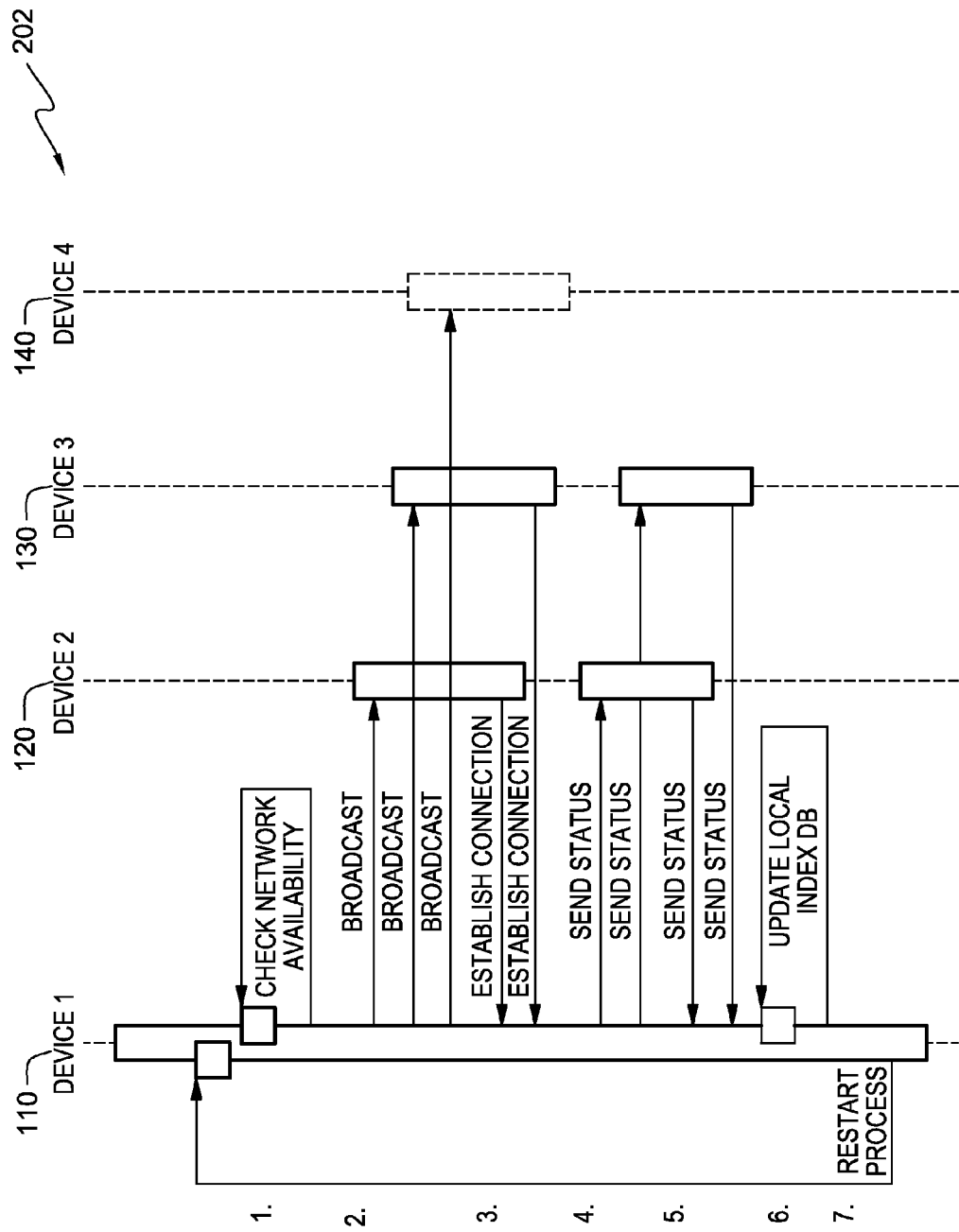
FIG. 3(A) is a diagram showing steps of identification of partner devices in a distributed backup system, in accordance with one embodiment of the present invention.
Figure 3B:
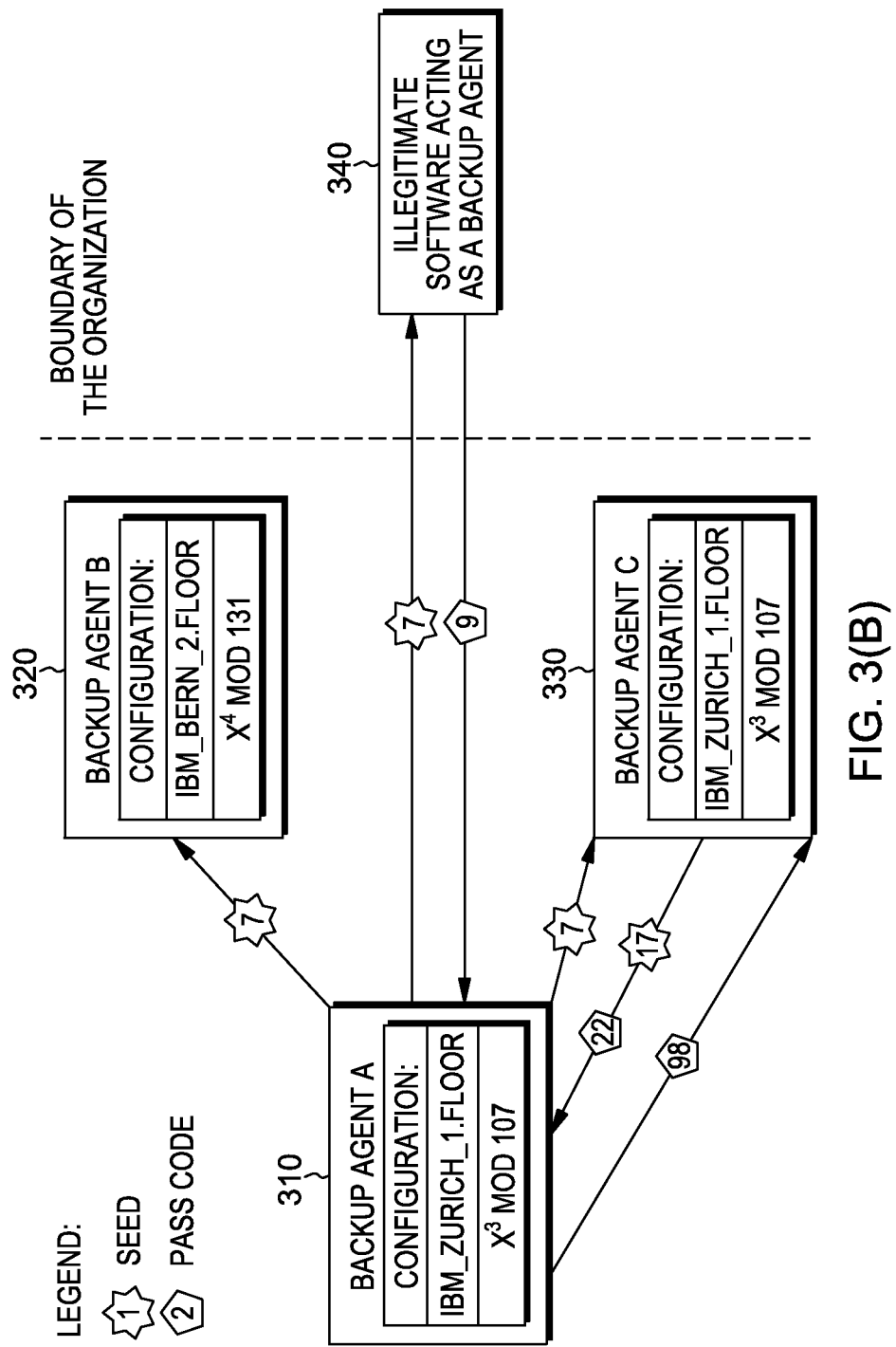
FIG. 3(B) is a diagram illustration authentication of computer devices in a distributed backup system, in accordance with one embodiment of the present invention.

FIG. 3(A) is a diagram showing steps of identification (202 shown in FIG. 2) of partner devices in distributed backup system 100, in accordance with one embodiment of the present invention. The steps of the identification of the partner devices are implemented by a backup agent on each device. For example, the steps are implemented by backup agents backup agents 1 through 6 (111, 121, 131, 141, 151, and 161) on devices 1 though 6 (110, 120, 130, 140, 150, and 160) shown in FIG. 1. FIG. 3(A) shows an example in which identification of partner devices, devices 2-4 (120, 130, and 140), is done by device 1 (110).

For the distributed backup system, backup agents in the self-organized network have to find each other and must ensure a secure and mutual authentication, so that data is not leaked out of the distributed backup system. As shown in FIG. 1, backup agents backup agents 1 through 6 (111, 121, 131, 141, 151, and 161) are installed on devices 1 though 6 (110, 120, 130, 140, 150, and 160), respectively. The backup agents indentify themselves via broadcast messages and then communicate directly with each other. Therefore, a central backup manager is not required. Each backup agent maintains a status list of its partner devices in its database.

Referring to FIG. 3(A), at step 1, backup agent 1 (111) on device 1 (110) checks network availability. Backup agent 1 (111) checks whether it is connected to the network of an organization. If the network availability is confirmed, backup agent 1 (111) on device 1 (110) will proceed the following steps.

At step 2, backup agent 1 (111) on device 1 (110) sends out a broadcast or multicast message to devices 2-4 (120, 130, and 140). The message contains a name of the organization and environment, a random number as a seed for a pass code, and the IP address of device 1 (110). The name of the organization and environment is a string with a fixed length, for example 80 characters. Different names may be given to different organizational units or device types; therefore, the different names are used to separate the backup services into various groups. The names are assigned to during roll-out of the backup agents. The random number may a positive integer. As a security feature, the method of sending the seed for the pass code and expecting a correct response pass code ensures that data (in a form of backup files) is not transferred outside the organization.

Upon receiving the broadcast or multicast message, backup agents of partner devices that are online (for example on devices 2 and 3 (120 and 130)) check whether the string contains a predetermined name of the organization and environment, calculates the pass code from the seed number, and determines whether it connects to the device that sends the broadcast or multicast message (for example device 1 (110)). As an example shown in FIG. 3(B), backup agent A (310) sends the broadcast or multicast message including its environment name "IBM_Zurich_1.floor" and a seed number "7" to backup agent B (320); backup agent B (320) ignores the broadcast or multicast message since the environment name is not matching. In the same example shown in FIG. 3(B), backup agent C (330) determines the match of the environment name "IBM_Zurich_1.floor" and calculates the pass code based on a predetermined formula on backup agents A and C: ($X^3$ MOD 107), where X is the seed number. Since the predetermined formula cannot be deduced by tapping into the network to collect seeds and pass codes, the risk of having a false backup agent connected can be minimized by selecting a large range of integers for the seed number and a large constant for the module operation in the predetermined formula. Backup agent C sends the calculated pass code "22" to backup agent A; simultaneously, in order to ensure authentication is performed bilaterally, backup agent C sends another seed number "17" to backup agent A. Upon receiving the seed number from backup agent C, backup agent A calculates the pass code based on the same predetermined formula shown above and sends the calculated pass code "98" to backup agent C. Thus, backup agents A and C complete an authorization process and identify each other as legitimate partners in the distributed backup system. In the same example shown in FIG. 3(B), the broadcast or multicast message is also received by illegitimate software acting as a backup agent (340). Due to the absence of the algorithm of generating the pass code, the illegitimate software can only guess the pass code ("9" in this example); thus, the authentication fails.

For security reasons, the broadcast range of the communication must be properly defined during backup agent installation. The range of the broadcast at step 2 is limited to the broadcast domain which depends on the nature of the network and the network configuration (typically a LAN or even a subnet). In case a network does not support broadcast (e.g., IPv6), multicast is used; thus, during backup agent roll-out, multicast receiver groups must be properly defined.

Referring to FIG. 3(A), at step 3, backup agents 2 and 3 (121 and 131) on devices 2 and 3 (120 and 130), which are online, establish connections to device 1 (110). The IP address included in the broadcast or multicast message is used by the backup agents of device 2 and 3 to directly connect to device 1. Device 4 (140) is offline and cannot receive the broadcast or multicast message; therefore, a connection between device 1 (110) and device 4 cannot be established.

At step 4, backup agent 1 (111) sends status information of device 1 (110) to backup agents 2 and 3 (121 and 131) on devices 2 and 3 (120 and 130). The status information of device 1 (110) contains: (1) Device 1 (110) is online on the network, and (2) Device 1 (110) has a certain storage capacity of backup pool 1 (113). At step 5, backup agents 2 and 3 (121 and 131) on devices 2 and 3 (120 and 130) send status information of devices 2 and 3 (120 and 130) to backup agent 1 (111) on device 1 (110). The status information of devices 2 and 3 (120 and 130) contains: (1) Devices 2 and 3 (120 and 130) are online, and (2) Devices 2 and 3 (120 and 130) have certain storage capacities of backup pool 2 (123) and backup pool 3 (133).

Referring to FIG. 3(A), at step 6, backup agents 1-3 (111, 121, and 131) update local index databases (namely, index database 1 of own files backup (114), index database 2 of own files backup (124), and index database 3 of own files backup (134)), respectively. At this step, the data of the status information is written in the local index databases. At step 7, backup agent 1 (111) restarts step 1 of the identification process (202), after a predetermined time delay. To restart the process, backup agent 1 (111) is triggered by scheduler 208.

Figure 4A:
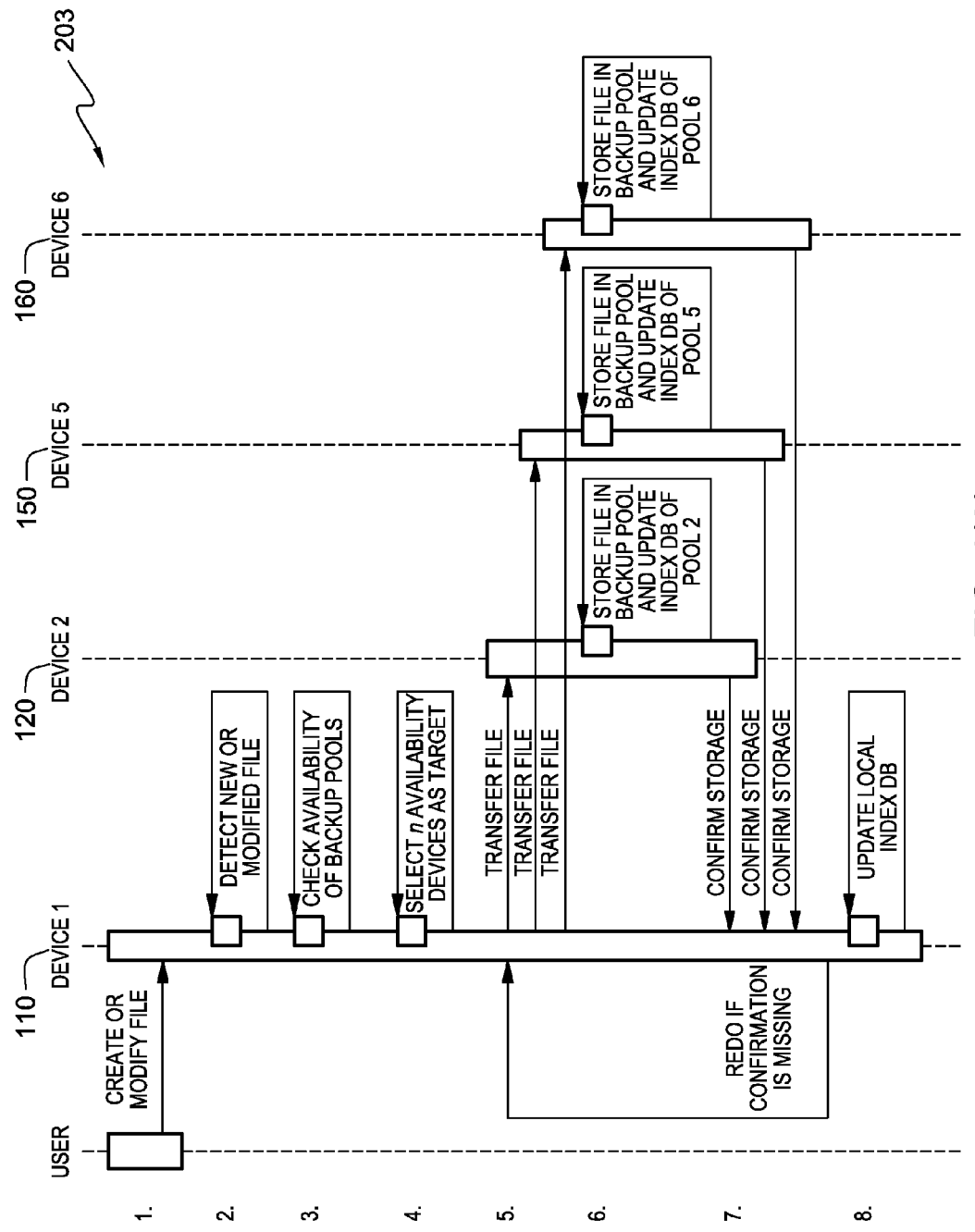
FIGS. 4(A) and 4(B) are diagrams showing steps of a backup process in a distributed backup system, in accordance with one embodiment of the present invention.
Figure 4B:
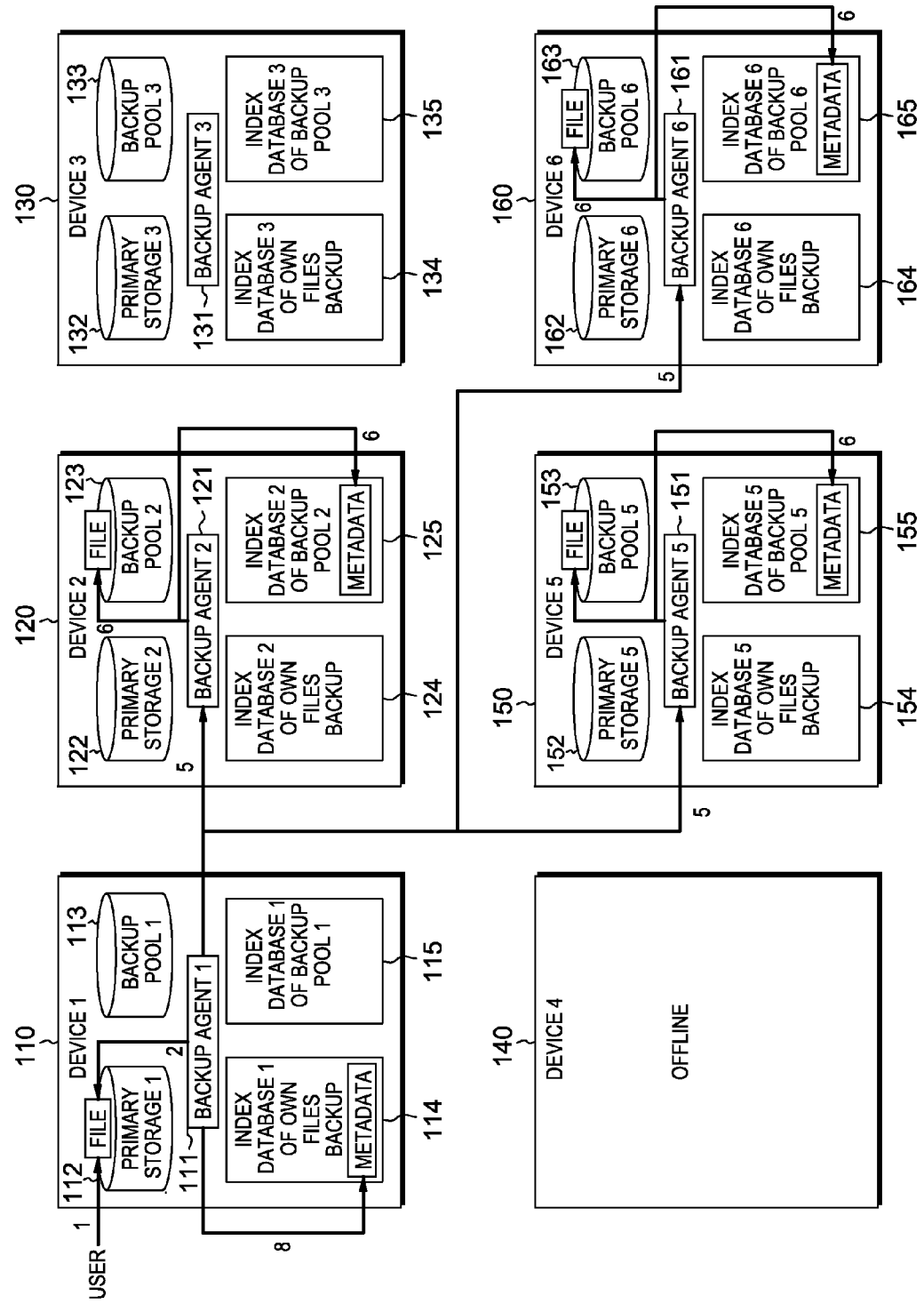

FIGS. 4(A) and 4(B) are diagrams showing steps of a backup process (203 shown in FIG. 2) in distributed backup system 100, in accordance with one embodiment of the present invention. The backup process is triggered when a file is written to a business data directory, either by a user or by a program running on behalf of a user. At step 1 of the backup process, the user or the program running on behalf of the user creates or modifies the file on device 1 (110). Once the backup process is triggered at step 1, backup agent 1 (111) on device 1 (110) at step 2 detects the creation or modification of the file.

Referring to FIG. 4(A), at step 3, backup agent 1 (111) on device 1 (110) checks whether a sufficient number of backup pools on partner devices are available. The sufficient number is a required number of backup pools for the backup process. The required number of the backup pools is pre-configured on backup agent 1 (111); for example, three backup pools (on three partner devices) are needed in the embodiment. At this step, backup agent 1 (111) retrieves information about available backup pools from index database 1 of own files backup (111) on device 1 (110). In case not enough backup pools are available, backup agent 1 (111) suspends the backup process; when backup agent 1 (111) determines the sufficient number of backup pools are available, backup agent 1 (111) resumes the backup process.

Referring to FIG. 4(A), at step 4, backup agent 1 (111) on device 1 (110) selects the required number of backup pools on the partner devices. At this step, backup agent 1 (111) randomly selects the required number of the partner devices which are online. In the embodiment, as shown in FIGS. 4(A) and 4(B), the partner devices of device 1 (110), device 4 (140) is offline while devices 2, 3, 5, and 6 (120, 130, 150, and 160) are online. From online devices 2, 3, 5, and 6 (120, 130, 150, and 160), backup agent 1 (111) randomly selects devices 2, 5, and 6 (120, 150, and 160) and will use backup pools thereon in the following steps.

Referring to FIGS. 4(A) and 4(B), at step 5, backup agent 1 (111) on device 1 (110) transfers the file to backup agents 2, 5, and 6 (121, 151, and 161) on devices 2, 5, and 6 (120, 150, and 160). Backup agent 1 (111) may be configured to compress and encrypt the file before transferring the file. Backup agent 1 (111) can be configured to perform this step in four ways: (1) to compress, encrypt, and then transfer the file; (2) to compress and then transfer the file; (3) to encrypt and the transfer the file; and (4) to transfer the file without compression and encryption.

Referring to FIGS. 4(A) and 4(B), at step 6, backup agents 2, 5, and 6 (121, 151, and 161) on devices 2, 5, and 6 (120, 150, and 160) store the file in backup pools 2, 5, and 6 (123, 153, and 163), and add records to index databases 2, 5, and 6 (125, 155, and 165) of backup pools. The records are metadata of the file; the metadata includes a unique identifier of device 1 (110), the source location information (directory), and a timestamp for versioning and expiration.

Referring to FIG. 4(A), at step 7, backup agents 2, 5, and 6 (121, 151, and 161) on devices 2, 5, and 6 (120, 150, and 160) send a confirmation to backup agent 1 (111) on device 1 (110). Backup agents 2, 5, and 6 (121, 151, and 161) inform backup agent 1 (111) that the file has been successfully stored on the backup pools and metadata files on the index databases of the backup pools have been updated. In case confirmation messages from one or more of devices 2, 5, and 6 (120, 150, and 160) fail to arrive (e.g., one of the devices was disconnected during the backup process), backup agent 1 (111) on device 1 (110) will select one or more other backup pools and then redo step 5. In case the one or more other backup pools are not available, backup agent 1 (111) will suspend the backup process until the one or more other backup pools are available.

Referring to FIGS. 4(A) and 4(B), at step 8, backup agent 1 (111) on device 1 (110) updates metadata on index database 1 (114) of own files backup. The metadata includes information about the file; the information includes file name, source directory, timestamp, list of backup pools used.

Figure 5A:
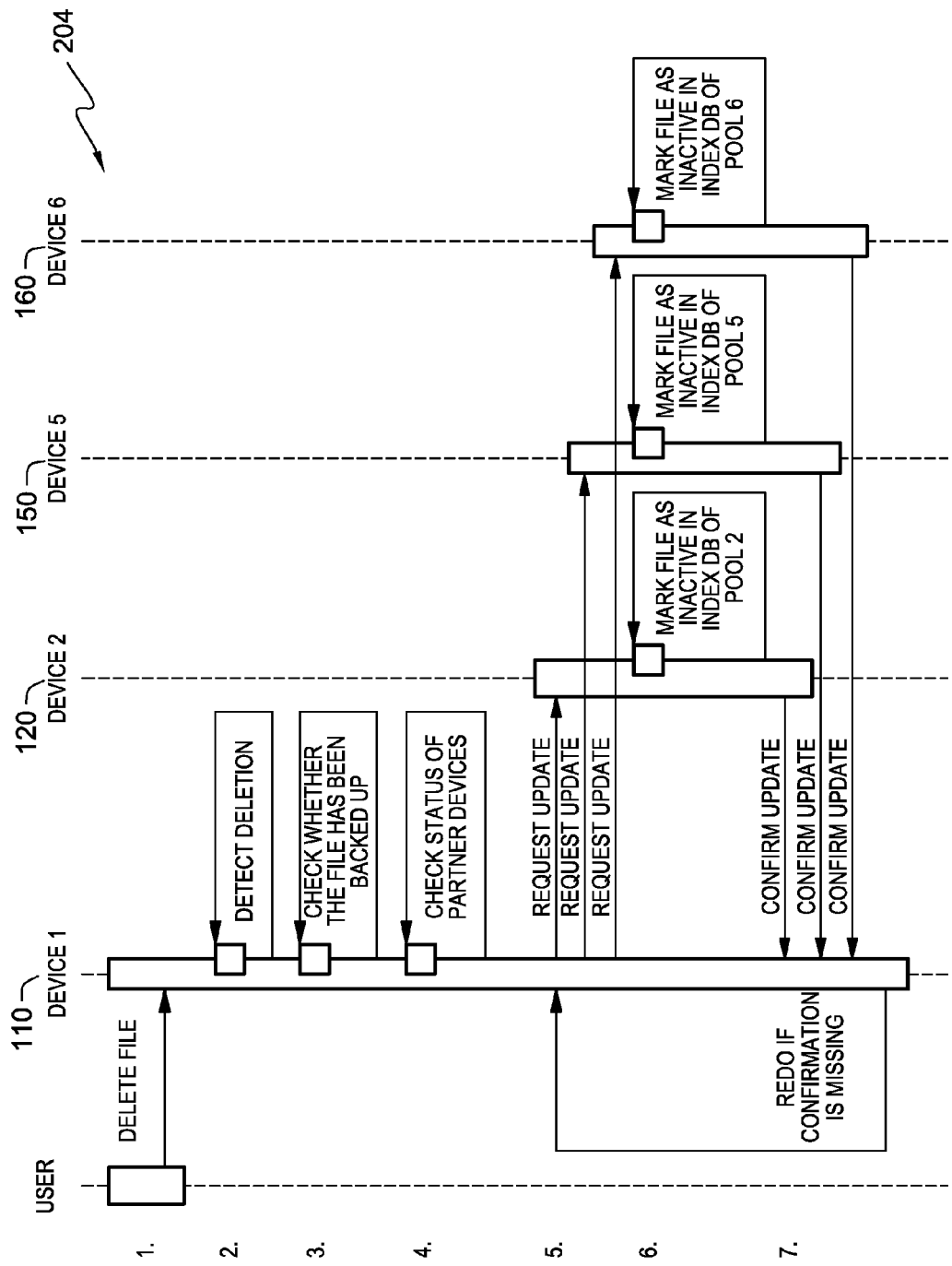
FIGS. 5(A) and 5(B) are diagrams showing steps of a file deletion process in a distributed backup system, in accordance with one embodiment of the present invention.
Figure 5B:
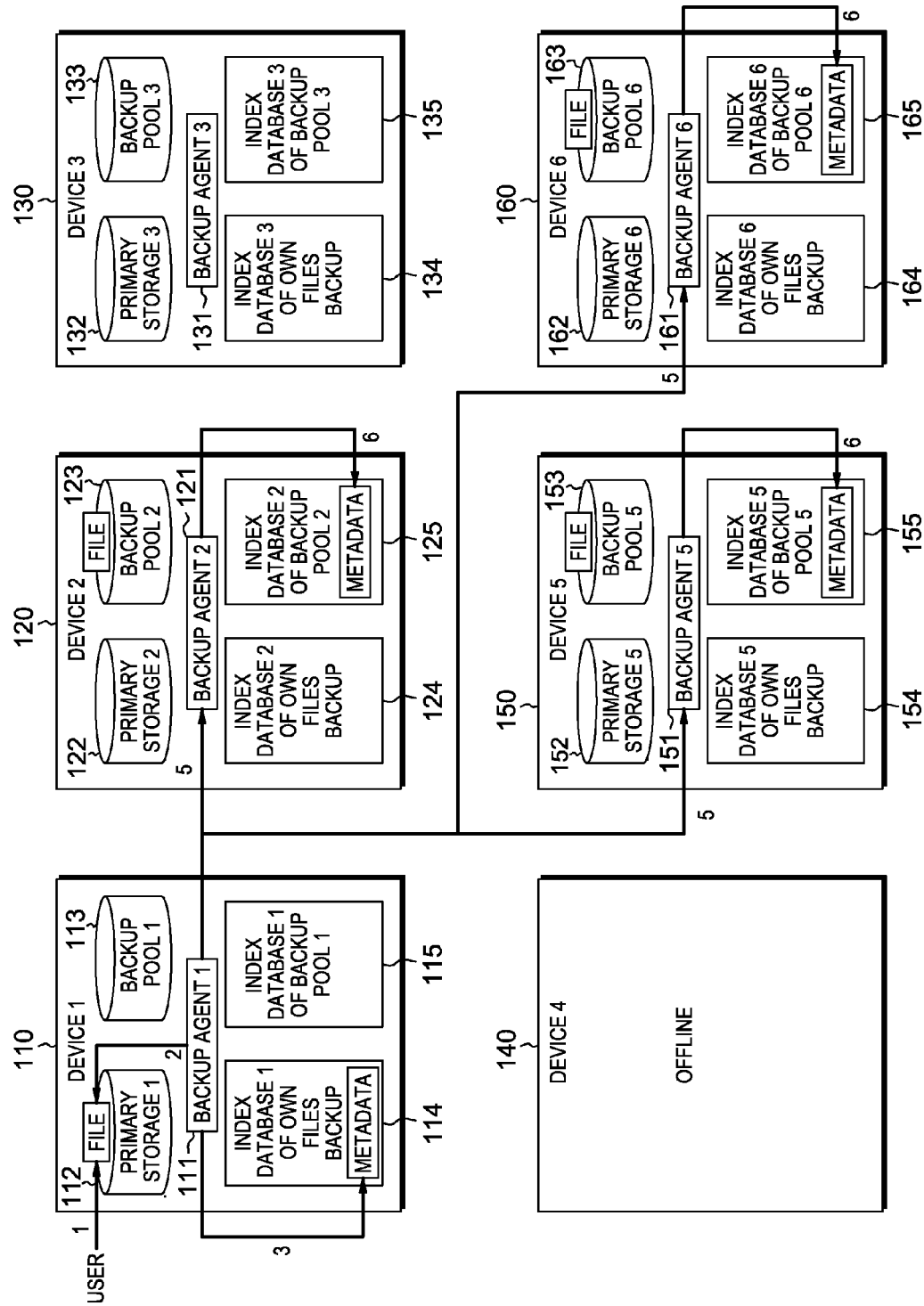

FIGS. 5(A) and 5(B) are diagrams showing steps of a deletion process (204 shown in FIG. 2) in distributed backup system 100, in accordance with one embodiment of the present invention. At step 1, a user deletes a file on device 1 (110). At step 2, backup agent 1 (111) on device 1 (110) detects the deletion. At step 3, backup agent 1 (111) checks whether the file has been backed up earlier. If it has not been backed up (e.g., backup agent 1 (111) is installed after the file has been modified), backup agent 1 (111) aborts the execution of the following steps and marks the file as inactive on index database 1 (114) of own files backup.

Referring to FIG. 5(A), at step 4, backup agent 1 (111) checks status of partner devices, i.e., devices 2, 5, and 6 (120, 150, and 160). At this step, backup agent 1 (111) retrieves, from index database 1 (114) of own files backup, a list of devices to which the file was backed up earlier; in this embodiment, the list includes devices 2, 5, and 6 (120, 150, and 160). Then, backup agent 1 (111) determines whether the devices are online. In case any of the devices is offline, the next step for offline devices will be delayed until the offline device becomes online. The process continues for online devices.

Referring to FIGS. 5(A) and 5(B), at step 5, backup agent 1 (111) requests backup agents 2, 5, and 6 (121, 151, and 161) on devices 2, 5, and 6 (120, 150, and 160) to update the status of the deleted file as inactive. At step 6, backup agents 2, 5, and 6 (121, 151, and 161) marks the status of the deleted file to inactive on index databases 2, 5, and 6 (125, 155, and 165) of backup pools on devices 2, 5, and 6 (120, 150, and 160). Note that the backup file of the deleted file on backup pools 2, 5, and 6 (123, 153, and 163) of devices 2, 5, and 6 (120, 150, and 160) is not touched. At step 7, backup agents 2, 5, and 6 (121, 151, and 161) send a confirmation to backup agent 1 (111) on device 1 (110), confirming that the file status has been successfully changed to inactive. In case the confirmation fails to reach backup agent 1 (111) on device 1 (110) (e.g., any of devices 2, 5, and 6 (120, 150, and 160) is offline during the process), backup agent 1 (111) on device 1 (110) will redo step 5 when the offline device is online again.

Figure 6A:
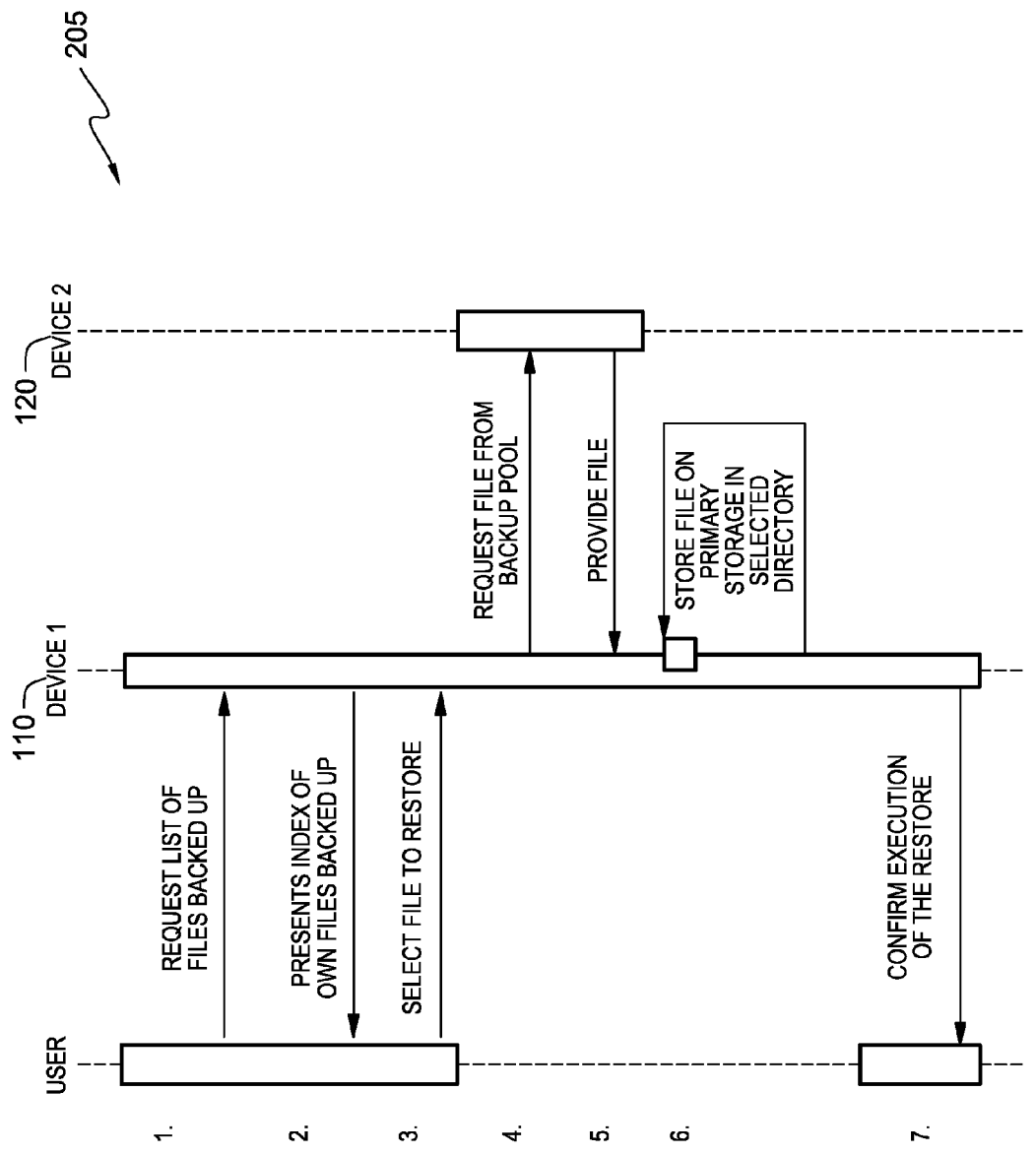
FIGS. 6(A) and 6(B) are diagrams showing steps of a file restore process in a distributed backup system, in accordance with one embodiment of the present invention.
Figure 6B:
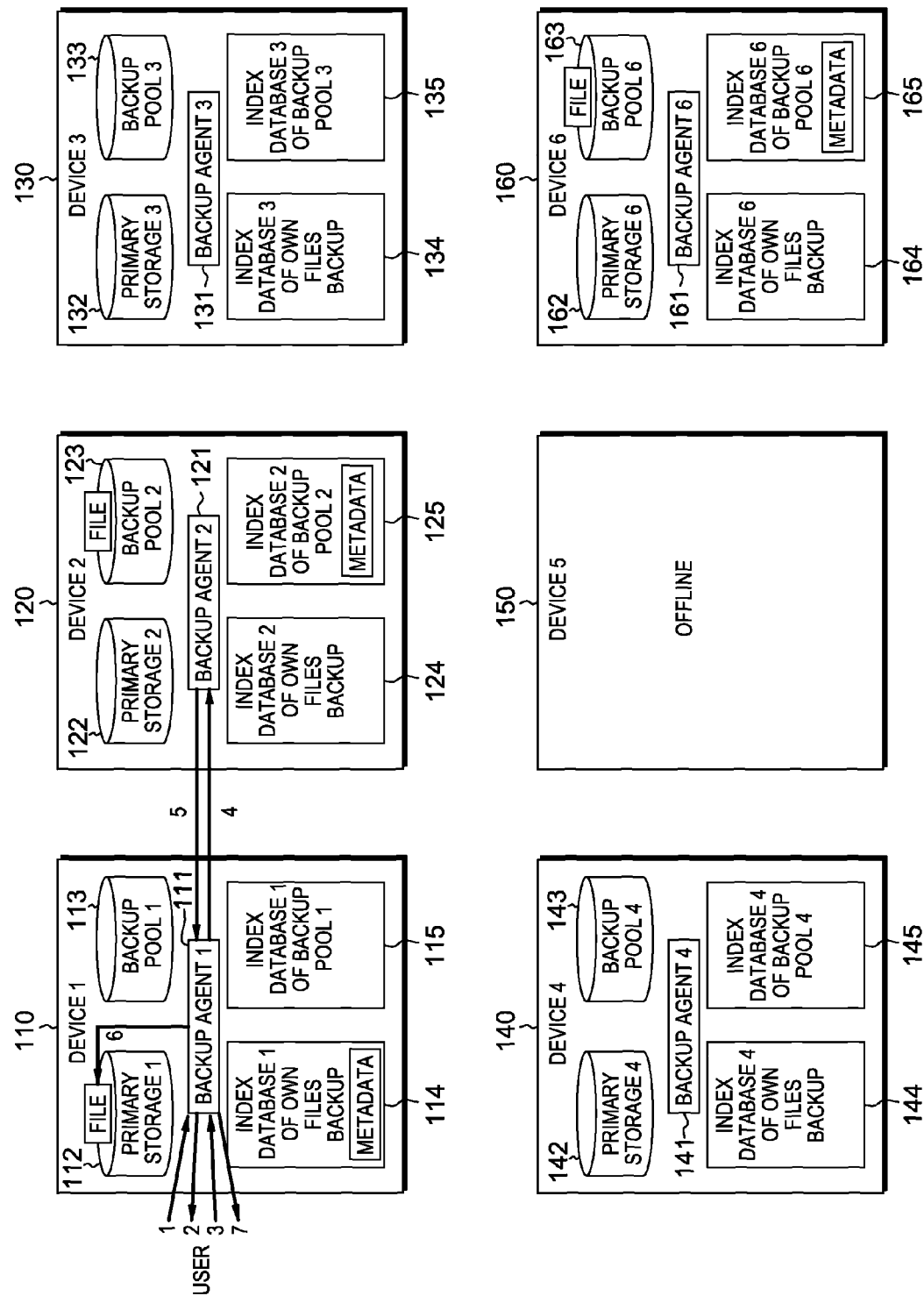

FIGS. 6(A) and 6(B) are diagrams showing steps of a file restore process (205 shown in FIG. 2) in distributed backup system 100, in accordance with one embodiment of the present invention. When a file is accidentally deleted or overwritten, a user can trigger the file restore process (205) to restore the file. At step 1, the user requests backup agent 1 (111) on device 1 (110) to provide a list of files backed up. The user makes the request by connecting to a GUI (Graphical User Interface) of backup agent 1 (111). At step 2, through the GUI, backup agent 1 (111) presents to the user a view of index database 1 (114) of own files backup, providing information saved in metadata on the index database. The information includes file names, source directory, backup timestamp, and online/offline status of backup pools on the partner devices. At step 3, the user selects a version of the file from the view after browsing through the information saved in metadata. In the embodiment, the selected version of the file is located on backup pool 2 (123) of device 2 (120). In case the selected version of the file is located in backup pools which are currently offline, the user may decide to postpone the restore request.

Referring to FIGS. 6(A) and 6(B), at step 4, backup agent 1 (111) on device 1 (110) requests backup agent 2 (121) on device 2 (120) to provide the file on backup pool 2 (123). In this example, device 2 (120) is online; therefore, backup agent 1 (111) sends the request to device 2 (120). In case more than one online backup pool can provide the selected version of the file, backup agent 1 (111) selects one backup pool randomly. If multiple files need to be restored, backup agent 1 (111) may request the files from different devices, respectively, in order to evenly distribute the loads. In this embodiment, at step 5, backup agent 2 (121) on device 2 (120) provides the file on backup pool 2 (123) to backup agent 1 (111).

Referring to FIGS. 6(A) and 6(B), at step 6, backup agent 1 (111) on device 1 (110) stores the file on primary storage 1 (112). Usually, the file is restored to its original directory; optionally, the user can change the restore target directory. Backup agent 1 (111) decrypts the file if the file has been encrypted. Backup agent 1 (111) decompressed the file if the file has been compressed. At step 7, backup agent 1 (111) confirms the execution of restoring the file on device 1 (110), displaying the confirmation in the GUI. In case restoring the file fails, backup agent 1 (111) displays an error message (e.g., device 2 (120) is disconnected during restoring the file or the file is corrupted).

In case the user wants to restore several files, steps 1-7 for one single file restore are repeated for each file. In case the user wants to restore a directory and subdirectories containing all files, the steps described above are followed with these considerations. (1) The oldest backup timestamp of all files of the set will be used as the backup timestamp. (2) Logical AND of the availability of all files of the set is used as availability of the directory.

Figure 7A:
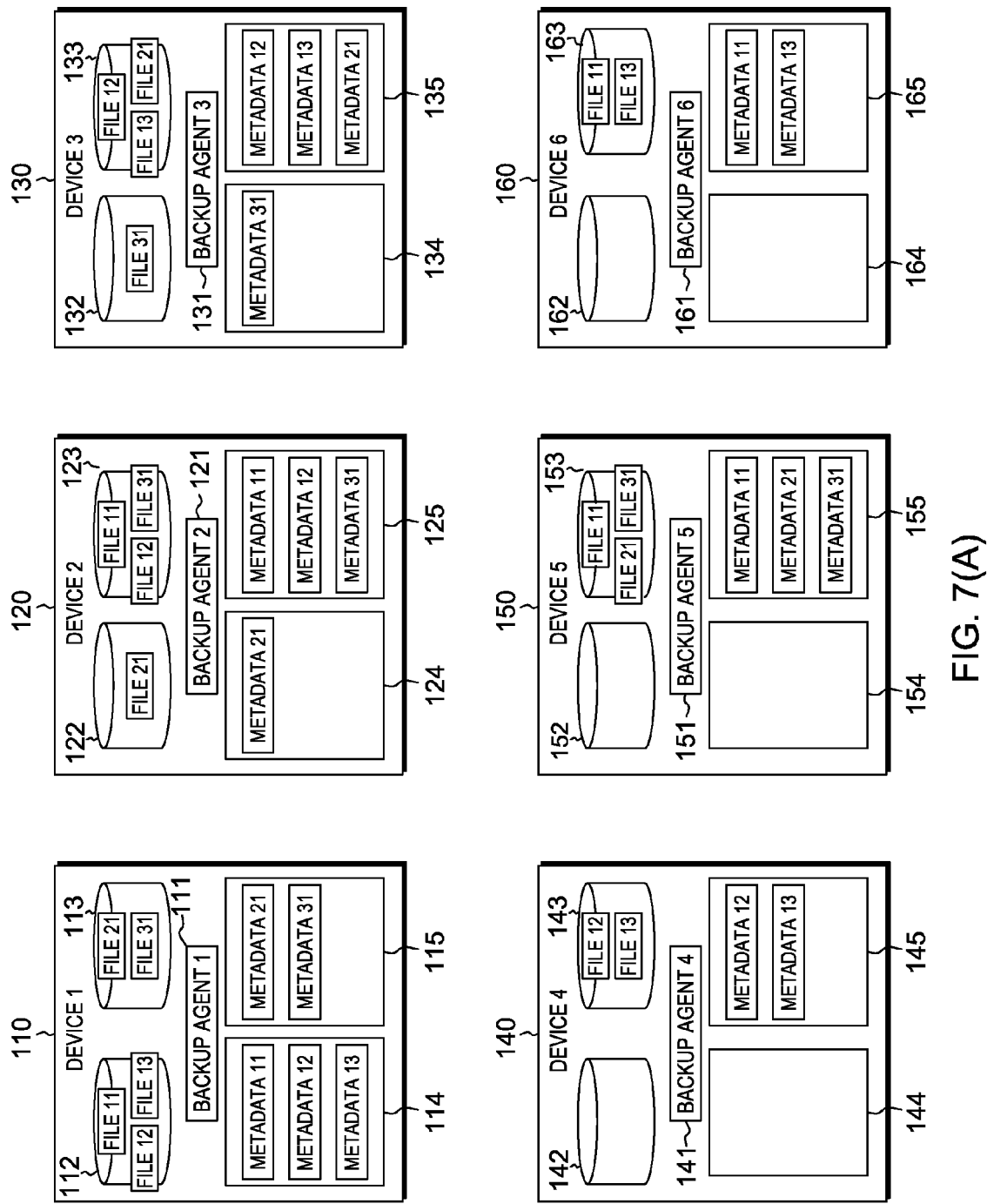
FIG. 7(A) is a diagram showing a state of a distributed backup system before a file system is lost, in accordance with one embodiment of the present invention.

FIG. 7(A) is a diagram showing a state of distributed backup system 100 before a file system on device 1 (110) is lost, in accordance with one embodiment of the present invention. If the disk of device 1 (110) has crashed or the device is lost or stolen, the file system on the device is lost. In a file system restore process (206 shown in FIG. 2), the file system on device 1 (110) should be restored to the state before the loss of the file system on device 1 (110). The state of distributed backup system 100 before the loss is discussed as follows.

In the embodiment presented in FIG. 7(A), primary storage 1 (112) on device 1 (110) includes three files: File 11, File 12, and File 13. Index database 1 (114) of own files backup includes three metadata files: Metadata 11, Metadata 12, and Metadata 13; the three metadata files correspond to the three files on the primary storage, respectively. Backup pool 1 (113) of device 1 (110) includes two backup files for File 21 and File 31; an original file of File 21 is on primary storage 2 (122) of device 2 (120) and an original file of File 31 is on primary storage 3 (132) of device 3 (130). Index database 1 (115) of backup pool 1 includes two metafiles: Metadata 21 and Metadata 31; the two metadata files correspond to the two backup files on backup pool 1 (113), respectively.

Referring to FIG. 7(A), on device 2 (120), primary storage 2 (122) includes a file: File 21, a metadata file of which is Metadata 21 stored on index database 2 (124) of own files backup. Backup pool 2 (123) includes three backup files for File 11, File 12, and File 31, which are two backup files for primary storage 1 (112) of device 1 (110) and one backup file for primary storage 3 (132) of device 3 (130). Index database 2 (125) of backup pool 2 includes three metafiles: Metadata 11, Metadata 12, and Metadata 31 for the three backup files on backup pool 2 (123), respectively.

Referring to FIG. 7(A), on device 3 (130), primary storage 3 (132) includes a file: File 31, a metadata file of which is Metadata 31 stored on index database 3 (134) of own files backup. Backup pool 3 (133) includes three backup files for File 12, File 13, and File 21, which are two backup files for primary storage 1 (112) of device 1 (110) and one backup file for primary storage 2 (122) of device 3 (130). Index database 3 (135) of backup pool 3 includes three metafiles: Metadata 12, Metadata 13, and Metadata 21 for the three backup files on backup pool 3 (133), respectively.

FIG. 7(A) only shows backup files on devices 4-6 (140, 150, and 160). Backup pool 4 (143) includes two backup files for File 12 and File 13, which are two backup files for primary storage 1 (112) of device 1 (110). Index database 4 (145) of backup pool 4 includes two metafiles: Metadata 12 and Metadata 13 for the two backup files on backup pool 4 (143), respectively. Backup pool 5 (153) includes three backup files for File 11, File 21, and File 31, which are one backup file for each of primary storage 1 (112) of device 1 (110), primary storage 2 (122) of device 2 (120), and primary storage 3 (132) of device 3 (130). Index database 5 (155) of backup pool 5 includes three metafiles: Metadata 11, Metadata 21, and Metadata 31 for the three backup files on backup pool 5 (153), respectively. Backup pool 6 (163) includes two backup files for File 11 and File 13, which are two backup files for primary storage 1 (112) of device 1 (110). Index database 6 (165) of backup pool 6 includes two metafiles: Metadata 11 and Metadata 13 for the two backup files on backup pool 6 (163), respectively.

Referring to FIG. 7(A), in summary, File 11 on device 1 (110) has backup files on devices 2, 5, and 6 (120, 150, and 160), File 12 on device 1 (110) has backup files on devices 2, 3, and 4 (120, 130, and 130), and File 13 on device 1 (110) has backup files on devices 3, 4, and 6 (130, 140, and 160).

Figure 7B:
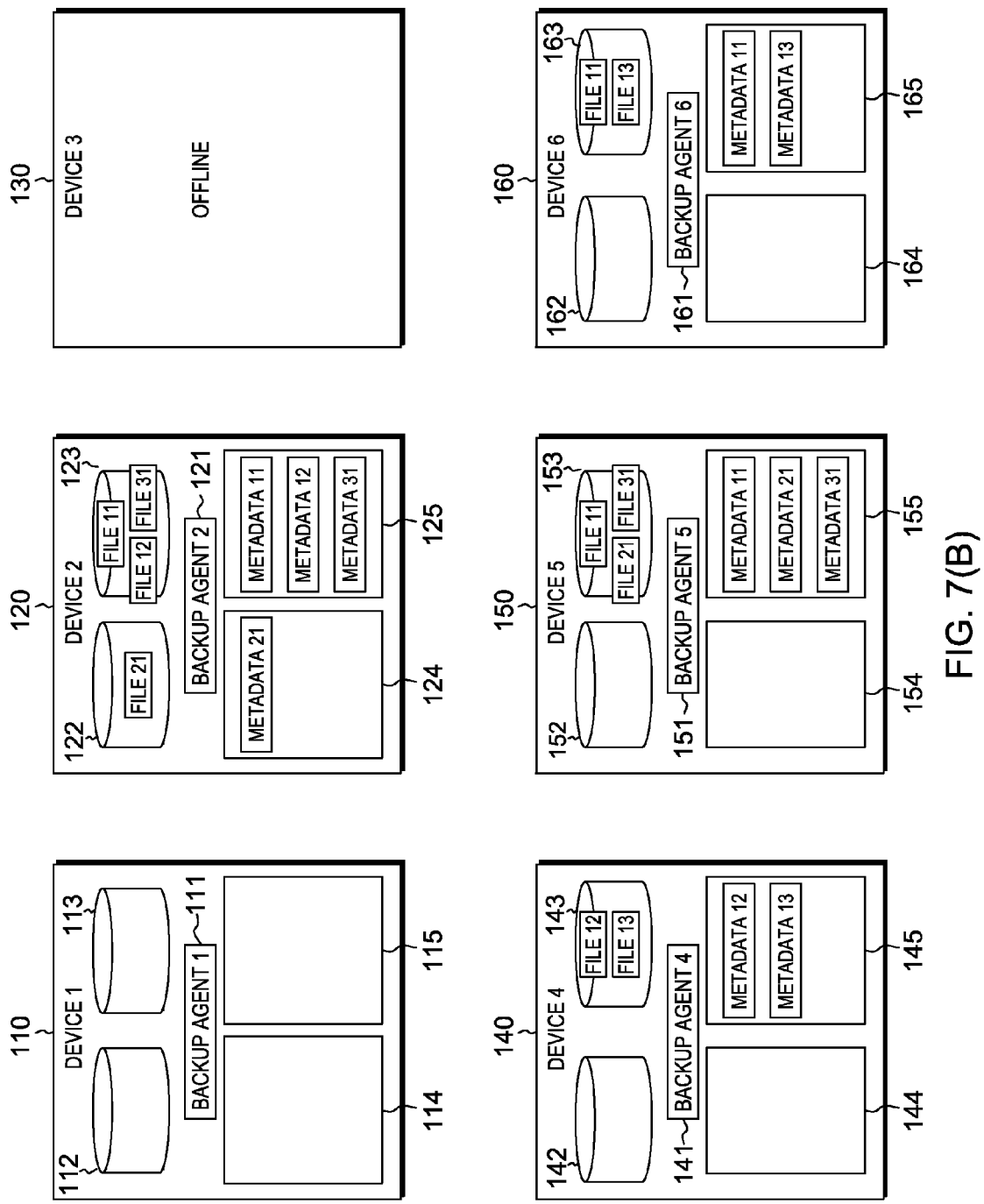
FIG. 7(B) is a diagram showing files in a distributed backup system just before a file system restore process starts, in accordance with one embodiment of the present invention.

FIG. 7(B) is a diagram showing a state of distributed backup system 100 just before a file system restore process starts, in accordance with one embodiment of the present invention. After the disk of device 1 (110) has crashed or the device is lost or stolen, the file system on the device is lost. As shown in FIG. 7(B), when the file system on device 1 (110) is restored, device 3 (130) is offline and devices 4-6 (140, 150 and 160) are online. On primary storage 1 (112), backup pool 1 (113), index database 1 (114) of own files backup, and index database 1 (115) of backup pool 1, all files are lost.

Figure 7C:
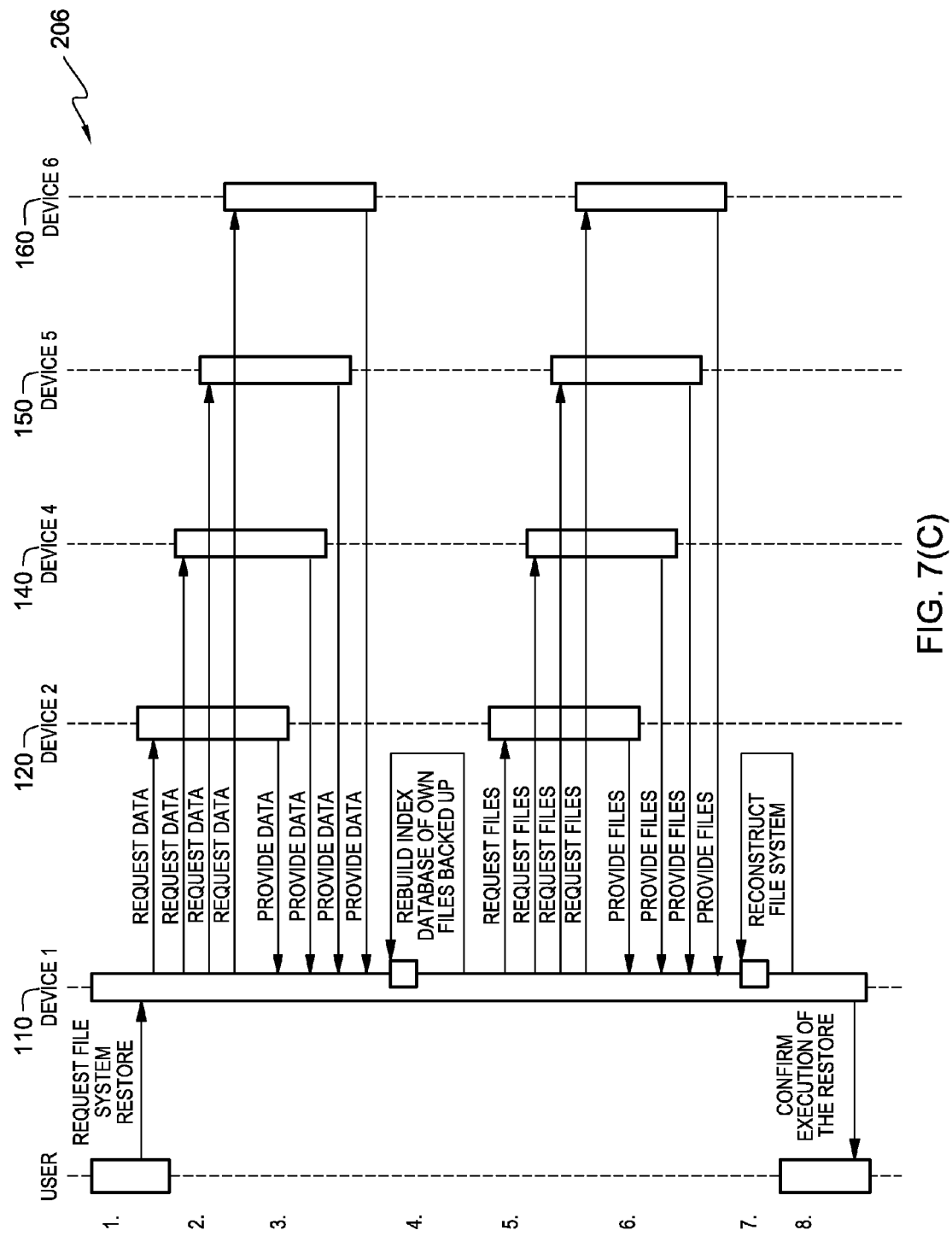
FIGS. 7(C)-7(F) are diagrams showing steps of a file system restore process in a distributed backup system, in accordance with one embodiment of the present invention.
Figure 7D:
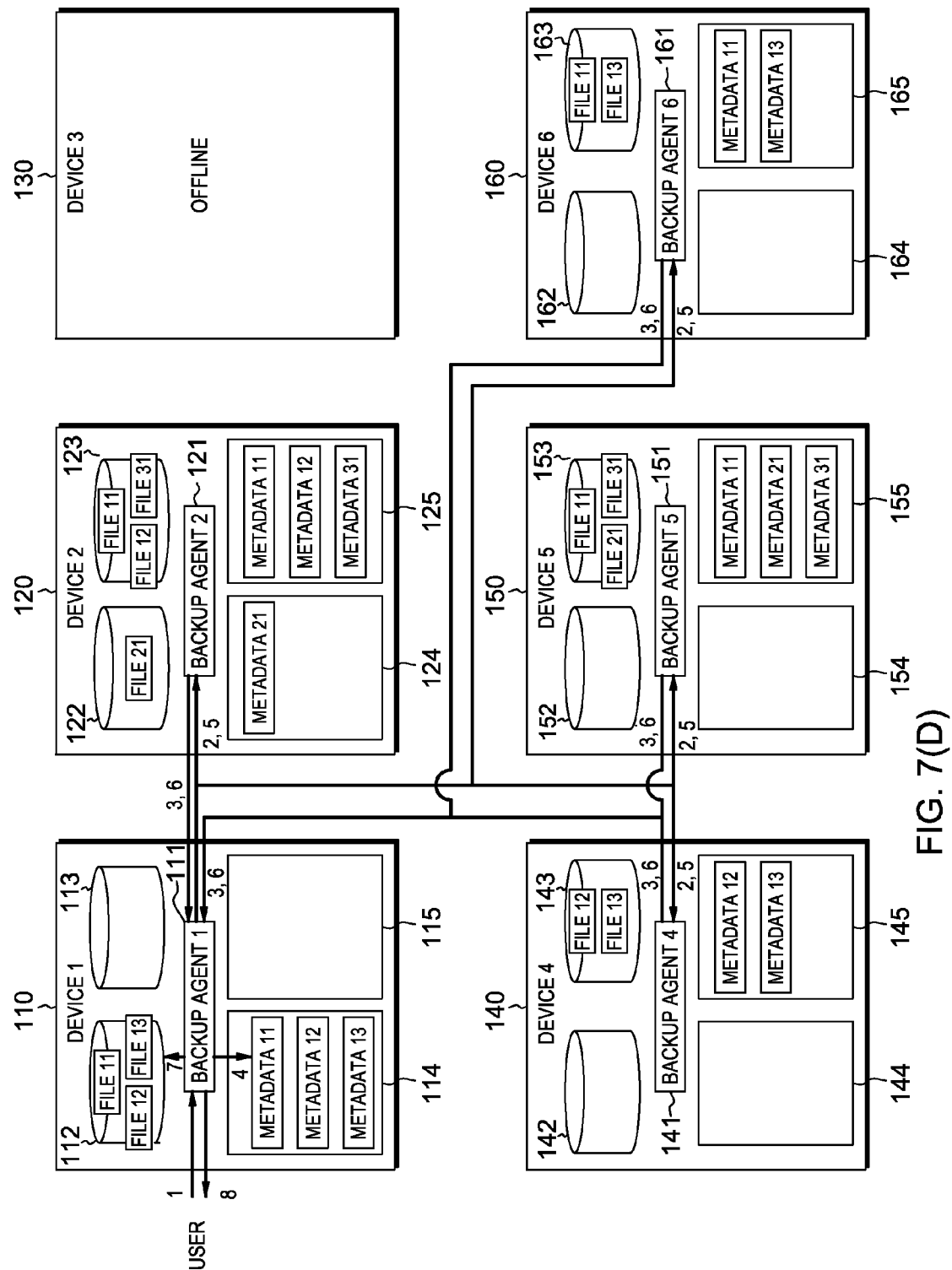
Figure 7E:
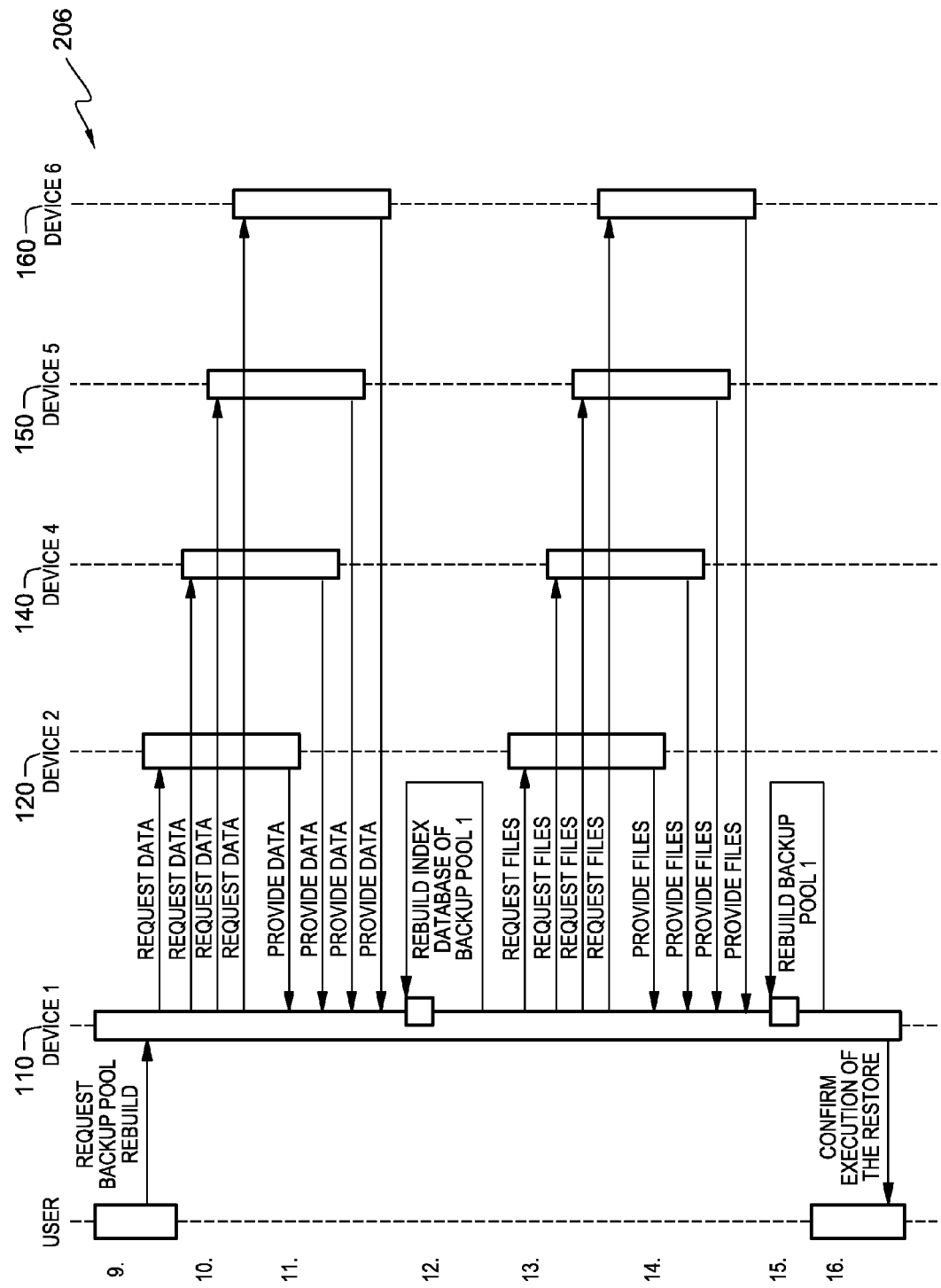
Figure 7F:
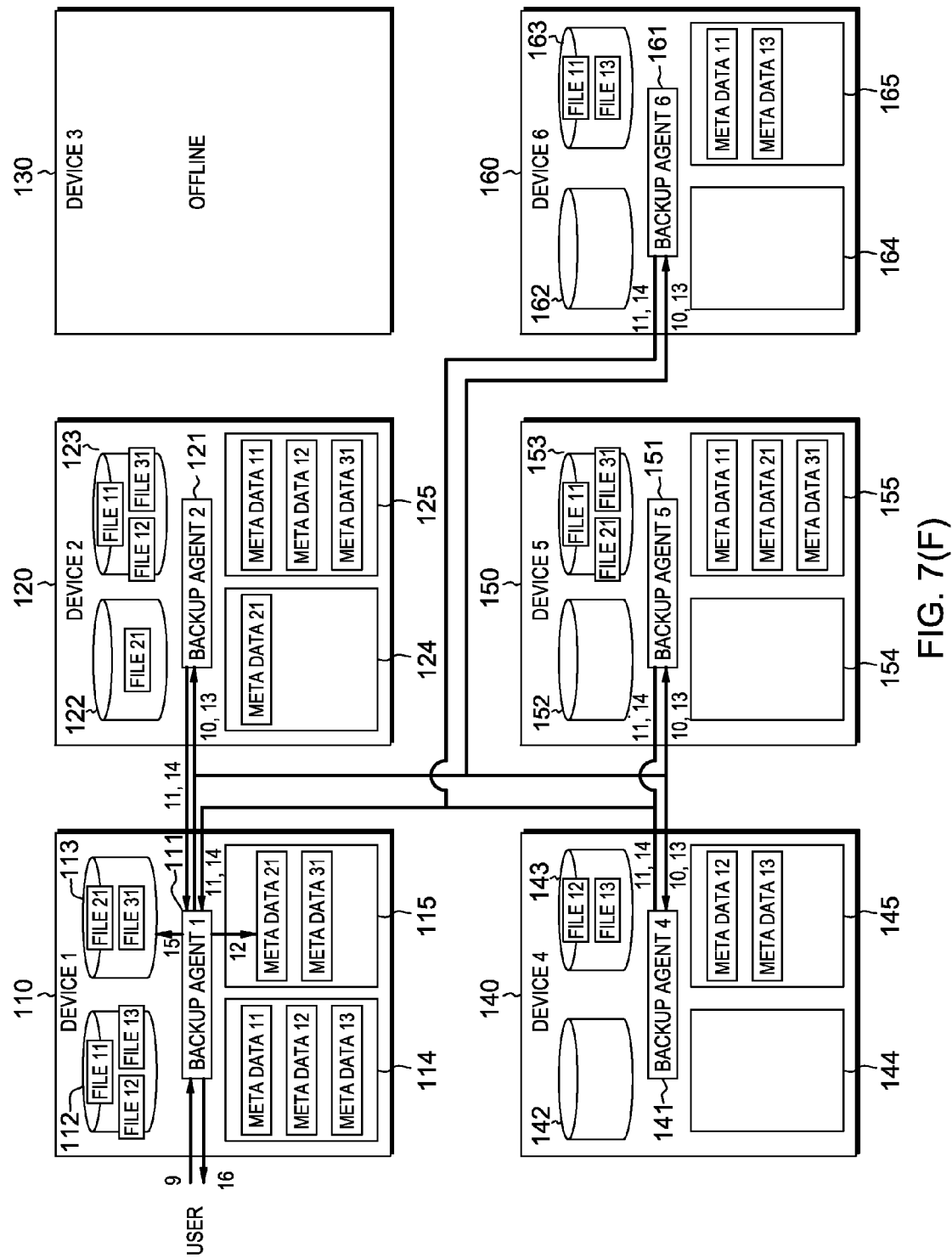

FIGS. 7(C)-7(F) are diagrams showing steps of a file system restore process (206 shown in FIG. 2) in distributed backup system 100, in accordance with one embodiment of the present invention. FIGS. 7(C)-7(D) shows steps of restoring primary storage 1 (112) and index database 1 (114) of own files backup on device 1 (110). FIGS. 7(E)-7(F) shows steps of restoring backup pool 1 (113) and index database 1 (115) of backup pool 1. During the file system restore process on device 1 (110), devices 2, 4, 5, and 6 (120, 140, 150, and 160) are online but device 3 (130) is offline.

Referring to FIGS. 7(C)-7(D), at step 1, through a GUI of backup agent 1 (111), a user requests to restore a file system. It has been mentioned in a previous paragraph that a MAC (media access control) address of device 1 (110) is used as a unique identifier (UID) of device 1 (110). In some cases of restoring the file system, the user must input the UID in order to identify backup files stored in backup pools of partner devices. (1) In a case in which mass storage of device 1 (110) is broken but device 1 (110) is still functioning, the MAC address of device 1 (110) can still be used for identifying the backup files. (2) In a case in which device 1 (110) is lost or damaged (not functioning) and user knows the UID of device 1 (110), the user enters the UID (which is the MAC address of previous device 1) when the user restores the file system on new device 1. (3) In a special case, device 1 (110) is lost or damaged (not functioning) and the user does not know the UID of the previous device 1, but the user knows the passphrase and encryption is used during backup of files. In this special case, when backup agent 1 (111) starts up, the user enters "0" as a UID and the passphrase. Backup agent 1 (111) connects to partner devices. After the authentication process described in previous paragraphs, backup agents on partner devices recognizes "0" as the UID and requests the encryption key. The backup agents on partner devices pick files from backup pools and apply the encryption key on the files. In case the files can be decrypted, the UID (MAC address) of the previous device 1 is recovered. The backup agents on partner devices send the recovered UID to the new device 1 for future operations. (4) In another special case, device 1 (110) is lost or damaged (not functioning), the user does not know the UID of the previous device 1, and encryption is not used during backup of files. In this case, when backup agent 1 (111) starts up, the user enters "0" as a UID and the passphrase. Backup agent 1 (111) connects to partner devices. After the authentication process described in previous paragraphs, backup agents on partner devices creates a list of unencrypted files in backup pools and their UIDs, and sends the list to backup agent 1 (111) which presents the list to the user. The user selects a file which belongs to the user. The UID of the selected file is used by backup agent 1 (111) for future operations.

Referring to FIGS. 7(C)-7(D), at step 2, backup agent 1 (111) sends a request to backup agents 2, 4, 5, and 6 (121, 141, 151, and 161) on devices 2, 4, 5, and 6 (120, 140, 150, and 160) for data stored on index databases 2, 4, 5, and 6 (125, 145, 155, and 165) of backup pools. The data provides information about backup files of device 1 (111). At step 3, backup agents 2, 4, 5, and 6 (121, 141, 151, and 161) provide the data requested by backup agent 1 (111). At step 4, backup agent 1 (111) reconstructs index database 1 (114) of own files backup on device 1 (110). As shown in FIG. 7(D), Metadata 11, Metadata 12, and Metadata 13 are restored. At step 5, backup agent 1 (111) requests files from backup agents 2, 4, 5, and 6 (121, 141, 151, and 161). Backup agent 1 (111) selects the latest version of each backup file; if the latest version of a file is available on more than one partner devices, backup agent 1 (111) selects randomly one of the more than one partner devices as a source of the file. At step 6, backup agents 2, 4, 5, and 6 (121, 141, 151, and 161) retrieve the backup files from backup pools 2, 4, 5, and 6 (123, 143, 153, and 163) and transfer the backup files to backup agent 1 (111). At step 7, backup agent 1 (111) reconstructs primary storage 1 (112) on device 1 (110). At this step, backup agent 1 (111) creates the original directory structure (as the original directory location is backed up with each file) and places the files accordingly. As shown in FIG. 7(D), File 11, File 12, and File 13 are restored. At step 8, backup agent 1 (111) sends a confirmation of successfully completing the file system restore process.

Backup agent 1 (111) cannot calculate the level of completeness (i.e., the number of files after restore is exactly the same as before the file system is lost). The user may decide whether another iteration of the file system restore process is desired. In case the user triggers the file system restore process again, steps 1 to 8 are performed again, with the exception that at step 5 backup agent 1 (111) will request only those files whose later versions are available and which are missed in the previous run.

After the files on device 1 (110) are restored to primary storage 1 (112), the user can request to reconstruct backup pool 1 (113) on device 1 (110). Referring to FIGS. 7(E)-7(F), at step 9, through a GUI of backup agent 1 (111), the user requests to restore backup pool 1 (113). At step 10, backup agent 1 (111) on device 1 (110) sends a request to backup agents 2, 4, 5, and 6 (121, 141, 151, and 161) on devices 2, 4, 5, and 6 (120, 140, 150, and 160) for data stored on index databases 2, 4, 5, and 6 (124, 144, 154, and 164) of own files backup. The data provides information about backup files that have been stored on backup pool 1 (113) before the file system on device 1 (110) is lost, and also provides information about versions of the backup files that have been stored on the backup pools of the partner devices. At step 11, backup agents 2, 4, 5, and 6 (121, 141, 151, and 161) provide backup agent 1 (111) with the data that includes the information. At step 12, backup agent 1 (111) reconstructs index database 1 (115) of backup pool 1. As shown in FIG. 7(F), Metadata 21 and Metadata 31 are restored. In these metafiles, the original timestamps of the backup files are included. At step 13, backup agent 1 (111) requests the files from backup agents 2, 4, 5, and 6 (121, 141, 151, and 161). Backup agent 1 (111) selects appropriate versions of each backup file; if the appropriate versions of a file is available on more than one partner devices, backup agent 1 (111) selects randomly one of the more than one partner device as a source of the file. At step 14, backup agents 2, 4, 5, and 6 (121, 141, 151, and 161) retrieve the files from backup pools 2, 4, 5, and 6 (123, 143, 153, and 163) and transfer the files to backup agent 1 (111). At step 15, backup agent 1 (111) reconstructs backup pool 1 (113) on device 1 (110). As shown in FIG. 7(F), File 21 and File 31 are restored. At step 16, backup agent 1 (111) sends a confirmation of successfully completing the file system restore process. Because backup agent 1 (111) cannot calculate the level of completeness (i.e., the number of files after restore is exactly the same as before the file system is lost), the user may iterate steps 9 to 16 to increase the completeness of backup pool 1 (113).

Figure 8A:
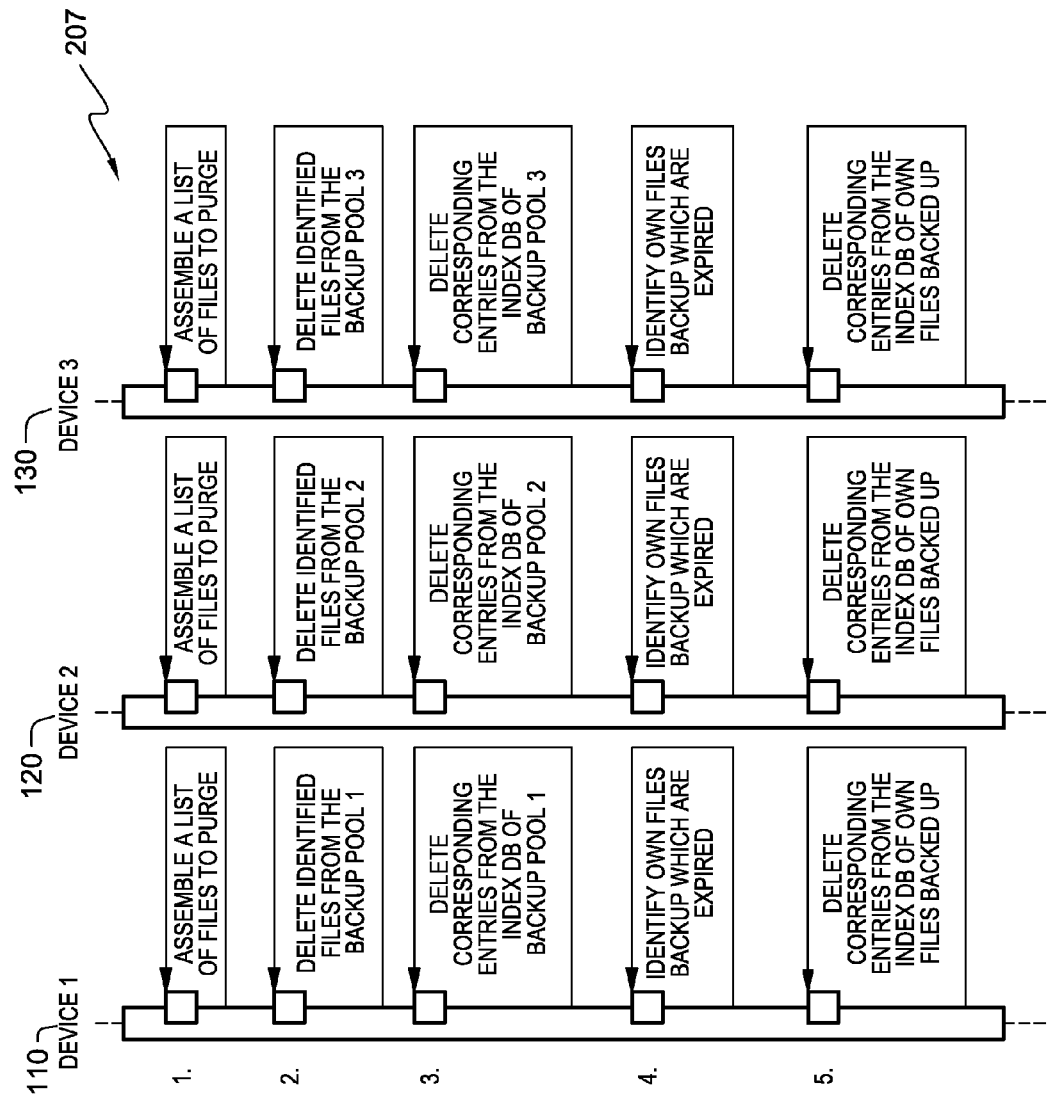
FIGS. 8(A) and 8(B) are diagrams showing steps of a process of backup pool purge in a distributed backup system, in accordance with one embodiment of the present invention.
Figure 8B:
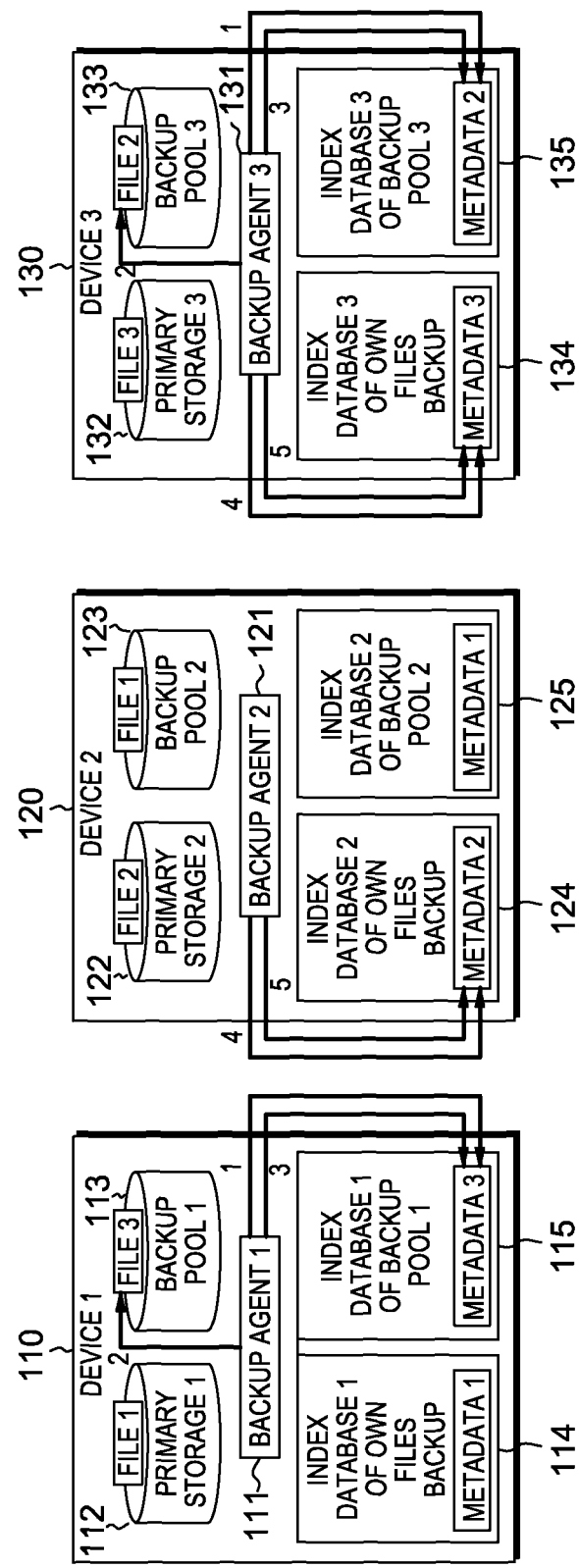

FIGS. 8(A) and 8(B) are diagrams showing steps of a process of backup pool purge (207 shown in FIG. 2) in distributed backup system 100, in accordance with one embodiment of the present invention. FIGS. 8(A) and 8(B) show an example of the backup pool purge on devices 1, 2, and 3 (110, 120, and 130).

To avoid running out of space on backup pools, backup files that have been stored for a certain time period are purged from the backup pools by backup agents. The backup agents distinguish active files (current version stored on devices) and inactive files (deleted or overwritten files). The backup agents run on a regular basis (e.g., once a day) and compare backup timestamps and active/inactive flags. Outdated files are immediately purged and therefore no longer available in a restore process. The corresponding entries in the index databases are also purged. However, files on the primary storages remain unaffected; the files will be backed up again if they are modified.

Each backup agent purges the backup pool independently, and no interaction between the devices is required. In the first three steps, a backup agent on each device removes files from the device's backup pool and the device's index database of the backup pool. In the fourth and fifth steps, the backup agent on each device removes entries from the device's index database of own files backup.

Referring to FIG. 8(A), at step 1, backup agents 1, 2, and 3 (111, 121, and 131) assemble a list of files to purge. At this step, the backup agents identify, on backup pools 1, 2, and 3 (113, 123, and 133), files that have exceeded predetermined retention time periods. At step 2, backup agents 1, 2, and 3 (111, 121, and 131) delete files on backup pools 1, 2, and 3 (113, 123, and 133), respectively. At step 3, backup agents 1, 2, and 3 (111, 121, and 131) delete metadata files (which correspond to the files deleted at step 2) on index databases 1, 2, and 3 (115, 125, and 135) of backup pools, respectively. At step 4, backup agents 1, 2, and 3 (111, 121, and 131) identify entries on index databases 1, 2, and 3 (114, 124, and 134) of own files backup. The entries relate to backup files of the files that have exceeded their retention period and are located on the backup pools of partner devices. At step 5, backup agents 1, 2, and 3 (111, 121, and 131) delete the entries on index databases 1, 2, and 3 (114, 124, and 134) of own files backup.

Figure 8C:
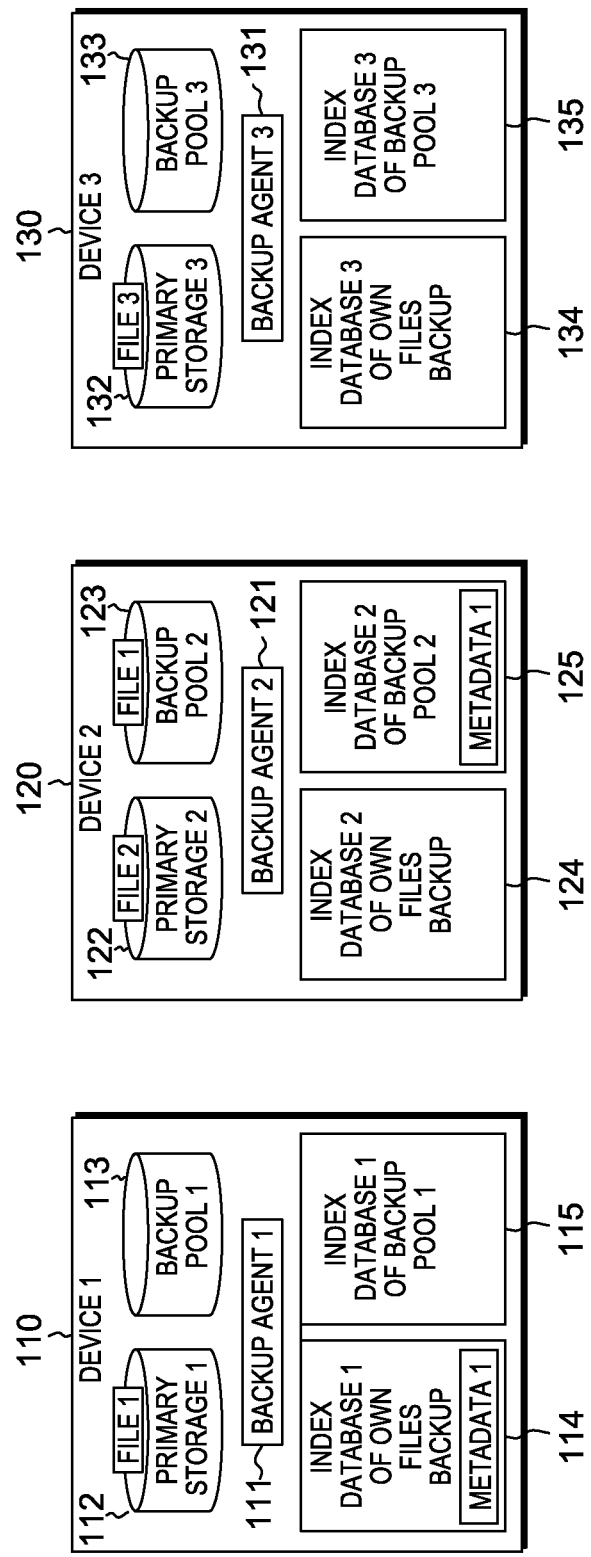
FIG. 8(C) is a diagram illustrating status after a process of backup pool purge in a distributed backup system is completed, in accordance with one embodiment of the present invention.

In the example shown in FIG. 8(B), the backup file of File 1 originating from device 1 (110) has not exceeded the retention time periods (or has not expired). However, the backup files of Files 2 and 3 have exceeded the retention time periods (or have expired). On device 1 (110), backup agent (111) removes the backup file of File 3 from backup pool 1 (113) and removes Metadata 3 (which is metadata for the backup file of File 3) from index database 1 (115) of backup pool 1 (113). On device 1 (110), because the backup file of File 1 has not exceeded retention time period, backup agent 1 (111) does not process steps 4 and 5. On device 2 (120), because the backup file of File 1 on backup pool 2 (123) has not exceed the retention time periods, backup agent 2 (121) does not process steps 1-3. On device 2 (120), the backup file of File 2 on primary storage 2 (122) has expired; therefore, backup agent 2 (121) processes steps 4 and 5 to delete Metadata 2 on index database 2 (124) of own files backup. On device 3 (130), the backup file of File 2 on backup pool 3 (133) has expired; therefore, backup agent 3 (131) processes steps 1-3 to delete the backup of File 2 on backup pool 3 (133) and to delete Metadata 2 on index database 3 (135) of backup pool 3 (133). On device 3 (130), the backup file of File 3 has expired; therefore, backup agent 3 (131) processes steps 4 and 5 to delete Metadata 3 on index database 3 (134) of own files backup. FIG. 8(C) shows files on devices 1, 2, and 3 (110, 120, and 130) after a process of backup pool purge, in accordance with one embodiment of the present invention. The purge process never affects the files on primary storage 1, 2, and 3 (112, 122, and 133).

Figure 9:
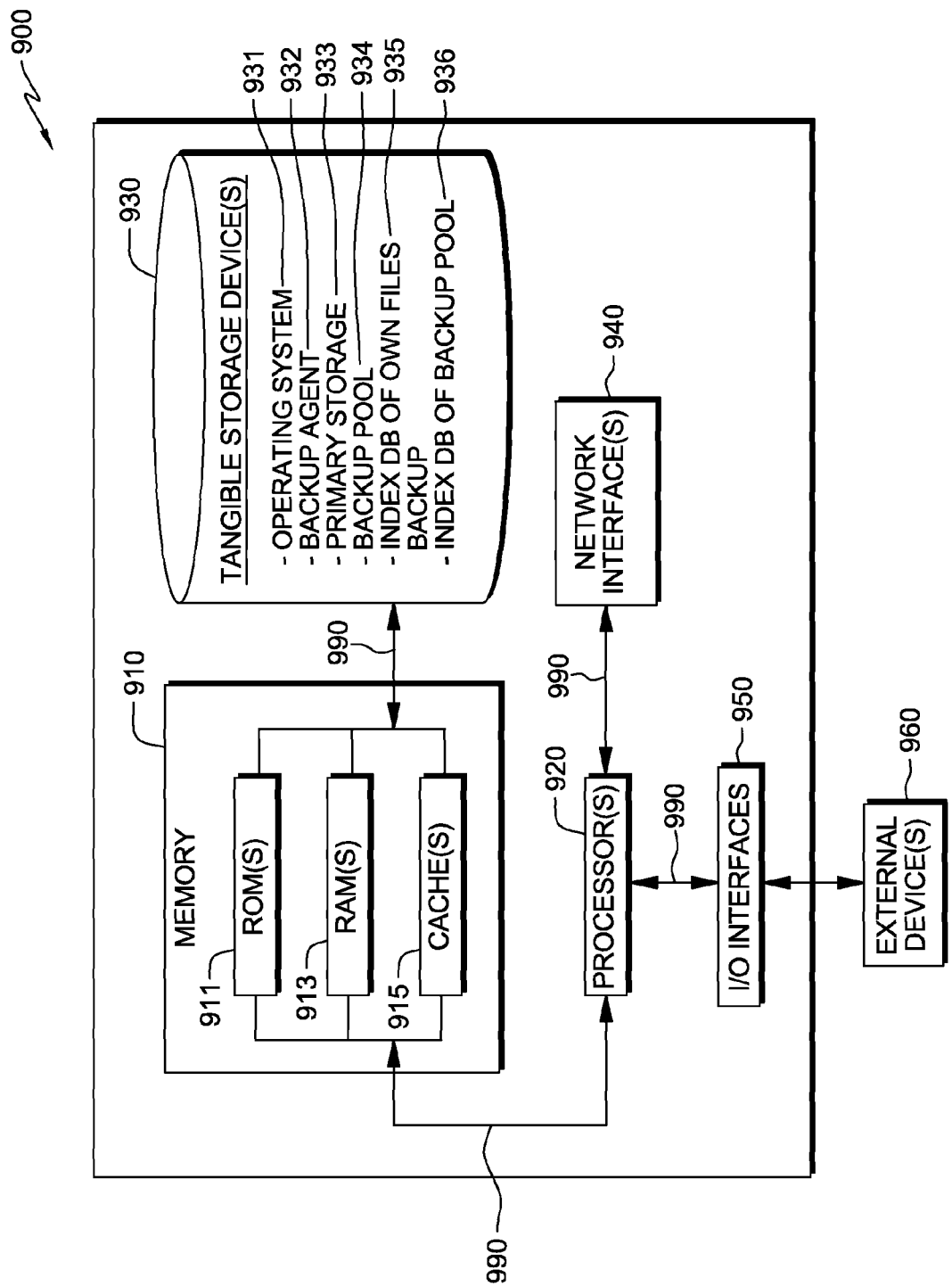
FIG. 9 is a diagram illustrating components of a device shown in FIG. 1, in accordance with one embodiment of the present invention.

FIG. 9 is a diagram illustrating components of a device shown in FIG. 1, in accordance with one embodiment of the present invention. It should be appreciated that FIG. 9 provides only an illustration of one implementation and does not imply any limitations with regard to the environment in which different embodiments may be implemented.

Referring to FIG. 9, computer device 900 includes processor(s) 920, memory 910, tangible storage device(s) 930, network interface(s) 940, and I/O (input/output) interface(s) 950. In FIG. 9, communications among the above-mentioned components of computing device 900 are denoted by numeral 990. Memory 910 includes ROM(s) (Read Only Memory) 911, RAM(s) (Random Access Memory) 913, and cache(s) 915. Tangible storage device(s) 930 includes operating systems 931, backup agent 932, primary storage 933, backup pool 934, index database 935 of own files backup, and index database 936 of backup pool. Computing device 900 further includes I/O interface(s) 950. I/O interface(s) 950 allows for input and output of data with external device(s) 960 that may be connected to computing device 900. Computing device 900 further includes network interface(s) 940 for communications between computing device 900 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for data backup in a distributed backup system, the distributed backup system comprising a plurality of computer devices connected by a network, the method comprising:

a software distribution system in the network detecting whether one of the computer devices has a backup agent;

the software distribution system installing the backup agent, in response to that the one of the computer devices does not have the backup agent;

the software distribution system configuring the backup agent according to backup policies in the network;

backup agents on the computer devices identifying and authenticating each other;

the backup agent on the one of the computer devices storing, on a first storage space of the one of the computer devices, a file of the one of the computer devices;

the backup agents on other ones of the computer devices storing, on respective first storage spaces of the other ones of the computer devices, respective files of the other ones of the computer devices;

the backup agent on the one of the computer devices sending a backup file of the file of the one of the computer devices to one or more of the other ones of the computer devices;

the backup agents on the one or more of the other ones of the computer devices storing, on respective second storage spaces of the one or more of the other ones of the computer devices, the backup file of the file of the one of the computer devices;

the backup agents on the other ones of the computer devices sending, to the one of the computer devices, backup files of the respective files of the other ones of the computer devices; and the backup agent on the one of the computer devices storing, on a second storage space of the one of the computer devices, the backup files of the respective files of the other ones of the computer devices.

2. The method of claim 1, further comprising:
in response to the file of the one of the computer devices being lost on the first storage space of the one of the computer devices, the backup agent on the one of the computer devices requesting the one or more of the other ones of the computer devices to provide the backup file of the file of the one of the computer devices;
the backup agent on the one of the computer devices receiving, from the one or more of the other ones of the computer devices, the backup file of the file of the one of the computer devices; and
the backup agent on the one of the computer devices restoring, on the first storage space of the one of the computer devices, the file of the one of the computer devices.

3. The method of claim 1, further comprising:
in response to a file system of the one of the computer devices being lost, the backup agent on the one of the computer devices requesting the one or more of the other ones of the computer devices to provide data of the file system of the one of the computer devices;
the backup agent on the one of the computer devices receiving the data from the one or more of the other ones of the computer devices; and
the backup agent on the one of the computer devices reconstructing the file system of the one of the computer devices, based on the data.

4. The method of claim 1, further comprising:
the backup agent on the one of the computer devices storing, on a first database of the one of the computer devices, a metadata file of the file of the one of the computer devices; and
the backup agent on the one of the computer devices storing, on a second database of the one of the computer devices, metadata files of the backup files of the respective files of the other ones of the computer devices.

5. The method of claim 1, further comprising:
the backup agents on the other ones of the computer devices storing, on respective first databases of the other ones of the computer devices, metadata files of the respective files of the other ones of the computer devices; and
the backup agents on the one or more of the other ones of the computer devices storing, on respective second databases of the one or more of the other ones of the computer devices, a metadata file of the backup file of the file of the one of the computer devices.

6. The method of claim 1, further comprising:
the backup agent on the one of the computer devices detecting deletion of the file of the one of the computer devices from the first storage space of the one of the computer devices;
the backup agent on the one of the computer devices requesting the one or more of the other ones of the computer devices to update status of the backup file of the file of the one of the computer devices; and
the backup agents on the one or more of the other ones of the computer devices marking, in metadata files on respective second databases of the one or more of the other ones of the computer devices, the status as inactive.

7. The method of claim 1, further comprising:
the backup agent on the one of the computer devices determining whether the backup files of the respective files of the other ones of the computer devices have expired; and
the backup agent on the one of the computer devices deleting the backup files of the respective files of the other ones of the computer devices and metadata files thereof, in response to determining that the backup files of the respective files of the other ones of the computer devices have expired;
the backup agent on the one of the computer devices determining whether the backup file of the file of the one of the computer devices has expired; and
the backup agent on the one of the computer devices deleting a metadata file of the backup file of the file of the one of the computer devices, in response to determining that the backup file of the file of the one of the computer devices has expired.

8. The method of claim 1, further comprising:
the backup agents on the one or more of the other ones of the computer devices determining whether the backup file of the file of the one of the computer devices has expired; and
the backup agents on the one or more of the other ones of the computer devices deleting the backup file of the file of the one of the computer devices and a metadata file thereof, in response to determining that the backup file of the file of the one of the computer devices has expired.

9. The method of claim 1, further comprising:
the backup agents on the other ones of the computer devices determining whether the backup files of the respective files of the other ones of the computer devices have expired; and
the backup agents on the other ones of the computer devices deleting metadata files of the respective files of the other ones of the computer devices, in response to determining that the backup files of the respective files of the other ones of the computer devices have expired.

10. A distributed data backup system, the system comprising:
a plurality of computer devices connected by a network;
one of the computer devices comprising a backup agent for managing data backup in the distributed data backup system, wherein the backup agent is installed by a software distribution system in the network, wherein the backup agent is configured by the software distribution system according to backup policies in the network;
the one of the computer devices comprising a first storage space for storing its own files;
the one of the computer devices comprising a second storage space for storing backup files of respective files of other ones of the computer devices;
the one of the computer devices comprising a first database for storing metadata files of its own files; and
the one of the computer devices comprising a second database for storing metadata files of the backup files of the respective files of the other ones of the computer devices.

11. The system of claim 10, further comprising:
wherein backup agents on the computer devices identify and authenticate each other;
wherein the backup agent on the one of the computer devices sends a backup file of a file of the one of the computer devices to one or more of the other ones of the computer devices;

wherein the backup agents on the one or more of the other ones of the computer devices store, on second storage spaces of the one or more of the other ones of the computer devices, the backup file of the file of the one of the computer devices;

wherein the backup agents on the other ones of the computer devices send, to the one of the computer devices, the backup files of the respective files of the other ones of the computer devices; and wherein the backup agent on the one of the computer devices stores, on the second storage space, the backup files of the respective files of the other ones of the computer devices.

12. The system of claim 10, further comprising:

wherein, in response to a file of the one of the computer devices stored on the first storage space being lost, the backup agent on the one of the computer devices requests one or more of the other ones of the computer devices to provide a backup file of the file of the one of the computer devices;

wherein the backup agent on the one of the computer devices receives, from the one or more of the other ones of the computer devices, the backup file of the file of the one of the computer device; and wherein the backup agent on the one of the computer devices restores, on the first storage space, the file of the one of the computer devices.

13. The system of claim 10, further comprising:

wherein, in response to a file system of the one of the computer devices being lost, the backup agent on the one of the computer devices requests one or more of the other ones of the computer devices to provide data of the file system of the one of the computer devices;

wherein the backup agent on the one of the computer devices receives the data of the file system from the one or more of the other ones of the computer devices; and wherein the backup agent on the one of the computer devices reconstructs the file system of the one of the computer devices, based on the data.

14. The system of claim 10, further comprising:

wherein the backup agent on the one of the computer devices detects deletion of a file of the one of the computer devices from the first storage space;

wherein the backup agent on the one of the computer devices requests one or more of the other ones of the computer devices to update status of a backup file of the file of the one of the computer devices; and wherein backup agents on the one or more of the other ones of the computer devices marks, in a metadata file on second databases of the one or more of the other ones of the computer devices, the status of the backup file as inactive.

15. The system of claim 10, further comprising:

wherein the backup agent on the one of the computer devices determines whether the backup files of the respective files of the other ones of the computer devices have expired;

wherein the backup agent on the one of the computer devices deletes the backup files of the respective files of the other ones of the computer devices and metadata files thereof, in response to determining that the backup files of the respective files of the other ones of the computer devices have expired;

wherein the backup agent on the one of the computer devices determines whether backup files of files of the one of the computer devices have expired; and wherein the backup agent on the one of the computer devices deletes metadata files of the backup files of the files of the one of the computer devices, in response to determining that the backup files of the files of the one of the computer devices have expired.

16. The system of claim 10, further comprising:

wherein backup agents on the one or more of the other ones of the computer devices determine whether backup files of files of the one of the computer devices have expired; and wherein the backup agents on the one or more of the other ones of the computer devices delete the backup files of the files of the one of the computer devices and metadata files thereof, in response to determining that the backup files of the files of the one of the computer devices have expired.

17. The system of claim 10, further comprising:

wherein backup agents on the other ones of the computer devices determine whether the backup files of the respective files of the other ones of the computer devices have expired; and wherein the backup agents on the other ones of the computer devices delete the metadata files of the backup files of the respective files of the other ones of the computer devices, in response to determining that the backup files of the respective files of the other ones of the computer devices have expired.

\* \* \* \* \*